United States Patent
Ijuin et al.

(10) Patent No.: US 11,205,814 B2
(45) Date of Patent: Dec. 21, 2021

(54) POWER STORAGE DEVICE PACKAGING MATERIAL AND POWER STORAGE DEVICE USING THE PACKAGING MATERIAL

(71) Applicant: TOPPAN PRINTING CO., LTD., Tokyo (JP)

(72) Inventors: Wataru Ijuin, Tokyo (JP); Satoshi Sasaki, Tokyo (JP); Masayoshi Suzuta, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 377 days.

(21) Appl. No.: 16/385,951

(22) Filed: Apr. 16, 2019

(65) Prior Publication Data

US 2019/0245165 A1 Aug. 8, 2019

Related U.S. Application Data

(63) Continuation of application No. PCT/JP2017/037227, filed on Oct. 13, 2017.

(30) Foreign Application Priority Data

Oct. 20, 2016 (JP) .............................. JP2016-205960
Jan. 6, 2017 (JP) .............................. JP2017-000974

(51) Int. Cl.
*H01M 2/02* (2006.01)
*H01M 2/08* (2006.01)
(Continued)

(52) U.S. Cl.
CPC ........... *H01M 50/124* (2021.01); *B32B 27/36* (2013.01); *H01G 11/78* (2013.01); *H01G 11/80* (2013.01);
(Continued)

(58) Field of Classification Search
None
See application file for complete search history.

(56) References Cited

U.S. PATENT DOCUMENTS

2013/0260161 A1* 10/2013 Nagae ................. H01M 50/124
428/480
2015/0232611 A1 8/2015 Manabe et al.
(Continued)

FOREIGN PATENT DOCUMENTS

JP 2011-204674 A 10/2011
JP 2012-124067 A 6/2012
(Continued)

OTHER PUBLICATIONS

European Search Report dated Sep. 25, 2019 for corresponding Application No. 17862917.6 (10 pages).
(Continued)

*Primary Examiner* — Christopher P Domone
(74) *Attorney, Agent, or Firm* — Foley & Lardner LLP

(57) ABSTRACT

A power storage device packaging material having a structure including at least a substrate layer, an adhesive layer, a metal foil layer, a sealant adhesive layer, and a sealant layer laminated in this order. The substrate layer is formed of a polyester film exhibiting ΔA, as expressed by the following formula, of 10% or more and a 50% elongation stress of 75 MPa or more after heat treatment at 160° C.: "ΔA=(break elongation after 160° C. heat treatment)−(break elongation before 160° C. heat treatment)".

12 Claims, 3 Drawing Sheets

(51) Int. Cl.
*H01G 11/80* (2013.01)
*H01G 11/84* (2013.01)
*H01M 50/124* (2021.01)
*B32B 27/36* (2006.01)
*H01G 11/78* (2013.01)
*H01M 50/10* (2021.01)
*H01M 50/116* (2021.01)
*H01M 50/183* (2021.01)

(52) U.S. Cl.
CPC ............ *H01G 11/84* (2013.01); *H01M 50/10* (2021.01); *H01M 50/116* (2021.01); *H01M 50/183* (2021.01); *Y02E 60/13* (2013.01)

(56) References Cited

U.S. PATENT DOCUMENTS

| | | | |
|---|---|---|---|
| 2015/0299406 A1 | 10/2015 | Gotou et al. | |
| 2016/0308174 A1 | 10/2016 | Takahagi et al. | |
| 2016/0365545 A1* | 12/2016 | Takahagi | B32B 27/34 |
| 2017/0025647 A1* | 1/2017 | Taniguchi | H01M 50/10 |
| 2017/0141362 A1 | 5/2017 | Ijuin | |
| 2018/0219192 A1* | 8/2018 | Ijuin | B32B 15/20 |

FOREIGN PATENT DOCUMENTS

| | | | |
|---|---|---|---|
| JP | 2012-124068 A | | 6/2012 |
| JP | 2012124067 A | † | 6/2012 |
| JP | 2012124068 A | † | 6/2012 |
| JP | 2013-101765 A | | 5/2013 |
| JP | 2014-022080 A | | 2/2014 |
| JP | 2014-049308 A | | 3/2014 |
| JP | 2016-186872 | | 10/2016 |
| JP | 2016-186872 A | | 10/2016 |
| JP | 2016186872 A | † | 10/2016 |
| JP | 6319323 B2 | † | 5/2018 |
| JP | 6481367 B2 | † | 3/2019 |
| WO | 2014077197 A1 | † | 5/2014 |
| WO | WO-2014/069236 A1 | | 5/2014 |
| WO | WO-2014/077197 A1 | | 5/2014 |
| WO | WO-2015/087901 A1 | | 6/2015 |
| WO | WO-2015/125806 A1 | | 8/2015 |
| WO | 2015156327 A1 | † | 10/2015 |
| WO | WO-2015/156327 A1 | | 10/2015 |
| WO | 2016010044 A1 | † | 1/2016 |
| WO | WO-2016/010044 A1 | | 1/2016 |
| WO | WO-2017/170333 A1 | | 10/2017 |

OTHER PUBLICATIONS

Office Action dated Nov. 4, 2020 for corresponding Japanese Patent Application No. 2016-205960.
International Searching Authority, "International Search Report," issued in connection with PCT/JP2017/037227, dated Jan. 16, 2018.
International Searching Authority, "Written Opinion," issued in connection with PCT/JP2017/037227, dated Jan. 16, 2018.
Observations by a Third Party dated Nov. 3, 2020 for corresponding European Patent Application No. 17862917.6.
European Search Opinion (6 pages), published Sep. 25, 2019.†

\* cited by examiner
† cited by third party

POWER STORAGE DEVICE PACKAGING MATERIAL AND POWER STORAGE DEVICE USING THE PACKAGING MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/037227, filed on Oct. 13, 2017, which is based upon and claims the benefit of priority to Japanese Patent Application No. 2016-205960, filed on Oct. 20, 2016 and Japanese Patent Application No. 2017-000974, filed on Jan. 6, 2017; the disclosures of which are all incorporated herein by reference in their entireties.

TECHNICAL FIELD

The present invention relates to a power storage device packaging material and a power storage device using the packaging material.

BACKGROUND ART

As power storage devices, there are known, for example, secondary batteries, such as lithium ion batteries, nickel hydride batteries, and lead batteries, and electrochemical capacitors, such as electric double layer capacitors. Due to miniaturization of mobile devices, limitation of installation spaces, or other reasons, further miniaturization of power storage devices is sought, and thus attention is being given to lithium ion batteries having high energy density. Packaging materials for lithium ion batteries have conventionally been metal cans. However, there is a growing trend of using multilayer films as such packaging materials because they are lightweight, highly heat dissipating, and produced at low cost.

Lithium ion batteries using such a multilayer film as a packaging material have a configuration in which battery contents (e.g., cathode, separator, anode, electrolyte solution) are covered with a packaging material that includes an aluminum foil layer to thereby prevent moisture from penetrating into the battery. A lithium ion battery using such a configuration is referred to as an aluminum laminated lithium ion battery.

Embossed lithium ion batteries, for example, are known as aluminum laminated lithium ion batteries. Such an embossed lithium ion battery is obtained by forming a recess in a part of the packaging material by cold forming, storing battery contents in the recess, and folding back the rest of the packaging material, with the edge portions being heat-sealed. (For example, see PTL 1). With such a lithium ion battery, as a deeper recess is formed in the packaging material by cold forming, higher energy density is achieved because more battery contents that can accordingly be stored in the recess.

CITATION LIST

[Patent Literature] [PTL 1] JP 2013-101765 A

SUMMARY OF THE INVENTION

Technical Problem

As stated above, power storage device packaging materials (which may just be termed packaging material(s) hereinafter) made of a multilayer film are required to have deep-drawing properties that enable formation of a recess with a desired depth. The present disclosure aims to provide a packaging material having adequate deep-drawing properties, and a power storage device using the packaging material.

Proposed Solution to Problem

The packaging material according to an aspect of the present disclosure has been made to solve the issues of inadequacy of deep-drawing properties and lack of suitability to a production process producing a thermal history at comparatively low temperature. The inventors of the present invention have focused on the heat applied to the film in the process of producing a multilayer film, and researched production of a multilayer film having a thermal history of temperature that is as low as possible (e.g., 160° C. or less). Packaging materials formed of a multilayer film are produced through a lamination process of bonding films to each other, or other processes. More specifically, methods of laminating a sealant layer and a metal foil layer are broadly categorized into a dry lamination method and a heat lamination method. In a dry lamination method, heat is applied to the materials at a drying temperature of about 80° C. to 140° C., whereas, in a heat lamination method, heat of about 140° C. to 200° C. is applied to the materials. If multilayer films can be produced without undergoing processing with a thermal history of high temperature that exceeds 160° C., the layers forming the multilayer films are prevented from being damaged due to heat, and the energy used in the production process can be reduced.

A power storage device packaging material according to the present disclosure has a structure including at least a substrate layer, an adhesive layer, a metal foil layer, a sealant adhesive layer, and a sealant layer laminated in this order. The substrate layer is formed of a polyester film exhibiting ΔA, as expressed by the following Formula (1), of 10% or more and a 50% elongation stress of 75 MPa or more after heat treatment at 160° C.

$$\Delta A = (\text{break elongation after 160° C. heat treatment}) - (\text{break elongation before 160° C. heat treatment}) \quad (1)$$

The break elongation and the 50% elongation stress are each an average of tensile tests at 23° C. (test piece shape: dumbbell No. 5 according to JIS K7127, length between chucks: 75 mm, gauge length: 25 mm, test speed: 50 mm/min) in four directions (0° (MD), 45°, 90° (TD), 135°) of the substrate layer. It should be noted that the "160° C. heat treatment" refers to heating the substrate layer (polyester film) for 30 minutes in heat that is maintained at 160° C.

The packaging material set forth above exhibits a difference (ΔA) in break elongation before and after heating at 160°, and 50% elongation stresses before and after the heating, which are within predetermined ranges, and thus is suitable for a production process having a thermal history of comparatively low temperature. Specific examples of the production process having a thermal history of comparatively low temperature as mentioned above include a dry lamination method (drying temperature in the range of about 80° C. to 140°), and a heat lamination method of comparatively low temperature conditions (heating temperature in the range of about 140° C. to 160° C.).

As described above, heat is applied to a film in the process of producing a packaging material. In general, the heat applied during lamination or the heat applied when the adhesive is dried may deteriorate the substrate layer and may cause breakage of the film when drawn. Even a substrate layer so rigid as almost not causing deterioration due to the heat applied during lamination or applied when the adhesive is dried, may possibly be broken when the film is drawn. The present disclosure aims to solve these issues and can provide adequate deep drawing properties.

The inventors of the present invention have focused on the substrate layer configuring a multilayer film. Among the various physical properties of the substrate layer, the inventors have studied those physical properties which affect the deep drawing properties of the multilayer film. As a result, it has been found that use of a substrate layer with a piercing strength of not less than a predetermined value can provide a multilayer film having adequate deep drawing properties. Specifically, the substrate layer is preferably formed of a polyester film having a piercing strength of 0.6 N/μm or more. The "piercing strength" is a measurement value according to the method prescribed by JIS Z1707, or, more specifically, refers to an average of the piercing strengths at five points measured using a probe with a diameter of 1.0 mm and a tip radius of 0.5 mm at a speed of 50 mm/min.

According to an aspect of the packaging material of the present disclosure, the packaging material may have a structure including at least a substrate layer, an adhesive layer, a metal foil layer, a sealant adhesive layer, and a sealant layer laminated in this order. In the packaging material, the substrate layer may be formed of a polyester film having a piercing strength of 0.6 N/μm or more. Since the packaging material has a specific lamination structure including a substrate layer with a piercing strength of 0.6 N/μm or more, adequate deep drawing properties are provided. The substrate layer is preferably formed of a polyester film having a 50% elongation stress of 75 MPa or more after 160° C. heat treatment. The packaging material including a substrate layer satisfying these conditions is suitable for a production process having a thermal history of comparatively low temperature.

The substrate layer is more preferably formed of a polyester film having a 50% elongation stress of 75 MPa or more after 160° C. heat treatment, and having a 50% elongation stress of 75 MPa or more after 200° C. heat treatment. The substrate layer satisfying these conditions is suitable for a production process having a thermal history of not only comparatively low temperatures, but also of comparatively high temperatures (e.g., of about 200° C.).

The packaging material according to the present disclosure preferably further includes an adhesion-enhancing treatment layer provided between the substrate layer and the adhesive layer. This may even more improve adhesion between the substrate layer and the adhesive layer and may also even more improve deep drawing properties.

The adhesion-enhancing treatment layer preferably contains at least one resin selected from the group consisting of a polyester resin, an acrylic resin, a polyurethane resin, an epoxy resin, and an acrylic grafted polyester resin. This may even more improve adhesion between the substrate layer and the adhesive layer and may also even more improve deep drawing properties.

The packaging material according to the present disclosure preferably further includes anticorrosion treatment layers respectively provided on both surfaces of the metal foil layer. This may reduce or prevent deterioration of the metal foil layer, and improve adhesion even more between the substrate layer and the metal foil layer.

As an example of the anticorrosion treatment layers, those layers which contain a rare earth element oxide, and phosphoric acid or phosphate may be mentioned. As an example of the rear earth element oxide, cerium oxide may be mentioned. Use of this configuration can even more improve adhesion between the substrate layer and the metal foil layer.

The sealant layer preferably has a surface with a static friction coefficient in the range of 0.10 to 0.30. With a static friction coefficient being in such a range, deep drawing properties may be improved even more. The static friction coefficient mentioned above refers to a value measured according to the method prescribed by JIS K7125.

The present disclosure provides a power storage device provided with battery elements including electrodes, leads extending from the respective electrodes, and a container sandwiching and holding the leads and storing battery elements. The container is formed of the packaging material of the present disclosure, so that the sealant layer is located on the inside. Since the power storage device uses the packaging material of the present disclosure as a container for storing the battery elements, an adequately deep recess can be formed without causing breakage or the like.

Desired Advantageous Effects of the Invention

The present disclosure provides a power storage device packaging material having adequate deep-drawing properties and a power storage device using the packaging material.

BRIEF DESCRIPTION OF THE DRAWINGS

FIGS. 2A and 2B are a set of diagrams in which FIG. 2A is a perspective view illustrating an embossed packaging material obtained by processing the packaging material shown in FIG. 1, and FIG. 2B is a longitudinal cross-sectional view taken along the line b-b of FIG. 2A.

FIGS. 3A, 3B, 3C, and 3D are a set of diagrams in which FIG. 3A is a perspective view illustrating the packaging material shown in FIG. 1, FIG. 3B is a perspective view illustrating the packaging material shown in FIG. 2A and battery elements, FIG. 3C is a perspective view illustrating the packaging material part of which has been folded back, with end portions being fused, and FIG. 3D is a perspective view illustrating the folded-back packaging material, with both ends being turned up.

DESCRIPTION OF THE REPRESENTATIVE EMBODIMENTS

Figure 1:
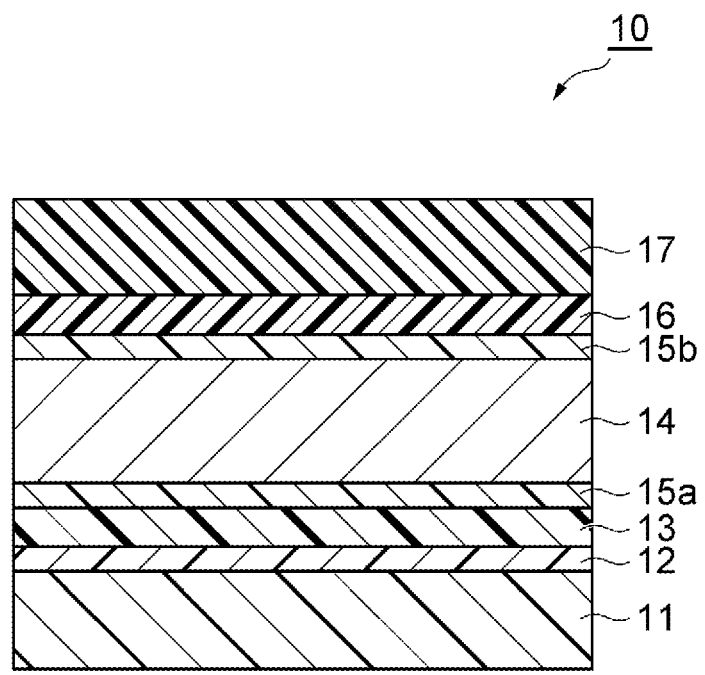
FIG. 1 is a schematic cross-sectional view illustrating a first embodiment of a packaging material according to the present disclosure.

With reference to the drawings, a description will now be given of embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. The same constituent elements are denoted by the same reference numerals unless there is a reason for the sake of convenience, and redundant description is omitted. In the drawings referred to in the following description, for clarity, characteristic parts are enlarged, and thus the components are not shown to scale.

[Power Storage Device Packaging Material]

FIG. 1 is a schematic cross-sectional view illustrating an embodiment of a power storage device packaging material according to the present disclosure. As shown in FIG. 1, a packaging material (power storage device packaging material) 10 of the present embodiment is a laminate including a substrate layer 11, an adhesion-enhancing treatment layer 12 provided to a surface of the substrate layer 11, an adhesive layer 13 provided to the adhesion-enhancing treatment layer 12, on a side opposite to that facing the substrate layer 11, a metal foil layer 14 provided to the adhesive layer 13, on a side opposite to that facing the adhesion-enhancing treatment layer 12 and having anticorrosion treatment layers 15a and 15b on opposing surfaces thereof, a sealant adhesive layer 16 provided to the metal foil layer 14, on a side opposite to that facing the adhesive layer 13, and a sealant layer 17 provided to the sealant adhesive layer 16, on a side opposite to that facing the metal foil layer 14. The anticorrosion treatment layer 15a is provided to an adhesive layer 13 side surface of the metal foil layer 14 and the anticorrosion treatment layer 15b is provided to a sealant adhesive layer 16 side surface of the metal foil layer 14. In the packaging material 10, the substrate layer 11 is the outermost layer and the sealant layer 17 is the innermost layer. That is, the packaging material 10 is used, with the substrate layer 11 being on the outside of the power storage device and the sealant layer 17 being on the inside of the power storage device. Each layer will be described.

(Substrate Layer 11)

The substrate layer 11 imparts heat resistance and electrolyte resistance to the packaging material 10 to reduce or prevent possible occurrence of pinholes therein during processing or distribution. The heat resistance is effective in the pressure heat-sealing step, described later, performed during production of the power storage device. The electrolyte resistance is effective against electrolyte leakage from other power storage devices. The substrate layer 11 is formed of a polyester film exhibiting ΔA, expressed by the following Formula (1), of 10% or more and having a 50% elongation stress (F50 stress) of 75 MPa or more after heat treatment at 160° C.

$$\Delta A = (\text{break elongation after } 160°\text{ C. heat treatment}) - (\text{break elongation before } 160°\text{ C. heat treatment}) \quad (1)$$

In the present embodiment, the break elongation and the 50% elongation stress are defined as follows. That is, substrate layers each cut into an A4 size are heated for 30 minutes in an oven kept at a selected heat treatment temperature (160° C. or 200° C.). After that, tensile tests (test piece shape: dumbbell No. 5 according to JIS K7127, length between chucks: 75 mm, gauge length: 25 mm, test speed: 50 mm/min) are performed in four directions (0° (MD), 45°, 90° (TD), 135°) of the substrate layer at 23° C. (room temperature). Measurements in the four directions are then averaged to calculate break elongation and 50% elongation stress of the present embodiment. The break elongation is calculated as follows.

Break elongation (%)={(Gauge length at break−Gauge length before measurement)/Gauge length before measurement}×100

It should be noted that longitudinal and transverse directions of the substrate layer respectively match MD (mechanical feed direction) and TD (direction vertical to MD) of an original material of the substrate layer. Specifically, when the substrate layer 11 is made of a biaxially stretched film, the longitudinal and transverse directions of a test piece each should match either one of the two stretching directions of the film.

Use of a substrate layer 11 satisfying the above conditions (ΔA and F50 stress) leads to obtaining a packaging material 10 which has sufficient deep-drawing properties and is suitable for a production process having a thermal history of comparatively low temperature (e.g., of about 160° C.).

A packaging material 10 exhibiting ΔA of 10% or more is less likely to break, even when the substrate layer 11 is in a state of being easily drawn greatly with a smaller force due to heat treatment at a comparatively low temperature, and thus enables deep drawing even after heat treatment (e.g., lamination heat treatment). From this perspective, ΔA is preferably 14% or more, and more preferably 16% or more. ΔA may have an upper limit of, but is not particularly limited to, approximately 100%. This is because when the substrate layer 11 is in a state of being easily drawn and the 50% elongation stress is excessively small, the substrate 11 is unlikely to protect the metal foil layer 14 from the forming stress.

From the perspective of achieving adequate deep-drawing properties for the packaging material 10, the substrate layer 11 preferably has a "break elongation before 160° C. heat treatment" exceeding 50%, more preferably in the range of 55% to 150%, and even more preferably in the range of 55% to 125%. Similarly, from the perspective of achieving adequate deep-drawing properties for the packaging material 10, the substrate layer 11 preferably has a "break elongation after 160° C. heat treatment" exceeding 60%, more preferably in the range of 65% to 160%, and even more preferably in the range of 65% to 135%.

In the packaging material 10, if the substrate layer 11 has a 50% elongation stress of 75 MPa or more after 160° C. heat treatment, a local force that would be applied to the packaging material 10 can be dissipated, and thus the metal foil layer 14 is prevented from being broken due to deep drawing. From this perspective, the 50% elongation stress after 160° C. heat treatment is preferably 80 MPa or more, and more preferably 85 MPa or more. The 50% elongation stress at 160° C. may have an upper limit of, but is not particularly limited to, approximately 250 MPa from the perspective of being used after being formed.

The substrate layer 11 is preferably formed of a polyester film having a 50% elongation stress of 75 MPa or more after 200° C. heat treatment. Use of a substrate layer 11 satisfying this condition leads to obtaining a packaging material 10 suitable for the production process having a thermal history of not only comparatively low temperature, but also comparatively high temperature (e.g., of about 200° C.). From this perspective, the 50% elongation stress at 200° C. is preferably 80 MPa or more, and more preferably 85 MPa or more. The 50% elongation stress at 200° C. may have an upper limit of, but is not particularly limited to, approximately 250 MPa from the perspective of being used after being formed.

The substrate layer 11 is preferably formed of a polyester film having a piercing strength of 0.6 N/μm or more. From the perspective of achieving more improved deep-drawing properties, the substrate layer 11 preferably has a piercing strength of 0.62 N/μm or more, and more preferably 0.65 N/μm or more. The piercing strength of the substrate layer 11 may have an upper limit of, but is not particularly limited to, approximately 1.5 N/μm from the perspective of availability of the polyester films used as the substrate layer 11. The piercing strength of polyester films normally depends on the polymerization degree of polyester (polymer length), the method of producing the polyester films, and the like. As polyester films tending to have a high piercing strength, those which are produced using a tubular process, or the like, for example, may be mentioned.

Examples of the polyester resin forming the polyester film of the substrate layer 11 include, but are not particularly limited to, as long as the above properties are satisfied, polyethylene terephthalate, polybutylene terephthalate, polyethylene naphthalate, polybutylene naphthalate, and copolyester. Of these materials, from the perspective of having good deep-drawing properties, copolyester is preferably used.

The polyester film may be one obtained through simultaneous stretching or biaxial stretching. From the perspective of obtaining better deep-drawing properties, a biaxially stretched polyester film is preferred.

The stretching method used for the biaxially stretched film may, for example, be sequential biaxial stretching, tubular biaxial stretching, simultaneous biaxial stretching, or the like. From the perspective of obtaining better deep-drawing properties, the biaxially stretched film is preferably one stretched through tubular biaxial stretching or simultaneous biaxial stretching.

The substrate layer 11 preferably has a thickness in the range of 6 μm to 40 μm, and more preferably 10 μm to 30 μm. The substrate layer 11, when having a thickness of 6 μm or more, tends to improve pinhole resistance and insulation properties of the power storage device packaging material 10. If the substrate layer 11 has a thickness exceeding 40 μm, the total thickness of the power storage device packaging material 10 increases, and the battery electrical capacity may have to be reduced accordingly. Therefore, the thickness of this range is not desirable.

(Adhesion-Enhancing Treatment Layer 12)

The adhesion-enhancing treatment layer 12 is provided to a surface of the substrate layer 11 and is disposed between the substrate layer 11 and the adhesive layer 13. The adhesion-enhancing treatment layer 12 improves adhesion between the substrate layer 11 and the adhesive layer 13, and even more improves adhesion between the substrate layer 11 and the metal foil layer 14. The adhesion-enhancing treatment layer 12 does not always have to be provided to the power storage device packaging material 10. In the absence of the adhesion-enhancing treatment layer 12, the adhesive layer 13 side surface of the substrate layer 11 may be corona-treated to improve adhesion between the substrate layer 11 and the adhesive layer 13 and to even improve adhesion between the substrate layer 11 and the metal foil layer 14.

The adhesion-enhancing treatment layer 12 preferably contains at least one resin selected from the group consisting of a polyester resin, an acrylic resin, a polyurethane resin, an epoxy resin, and an acrylic grafted polyester resin. Such an adhesion-enhancing treatment layer 12 can be formed by, for example, applying a coating agent onto a surface of the substrate layer 11. The coating agent in this case contains at least one resin, as a main component, selected from the group consisting of a polyester resin, an acrylic resin, a polyurethane resin, an epoxy resin, and an acrylic grafted polyester resin <Polyester Resin>

From the perspective of adhesion, the polyester resin is preferably a copolyester in which a copolymerization component is introduced for lowering of the glass transition temperature. From the perspective of coating properties, the copolyester is preferably water soluble or water dispersible. Such a copolyester is preferably one in which at least one group selected from the group consisting of a sulfonic acid group and an alkali metal salt group thereof is bound (also termed hereinafter sulfonic acid group-containing copolyester).

The sulfonic acid group-containing copolyester refers to a polyester to which at least one group selected from the group consisting of a sulfonic acid group and an alkali metal salt group thereof is bound to part of a dicarboxylic acid component or a glycol component. In particular, the copolyester is preferably prepared by using an aromatic dicarboxylic acid component containing at least one group selected from the group consisting of a sulfonic acid group and an alkali metal salt group thereof, at a ratio in the range of 2 mol % to 10 mol % relative to the total acid components.

As an example of such dicarboxylic acid, sodium 5-sulfoisophthalate is preferred. Examples of other dicarboxylic acid components include terephthalic acid, isophthalic acid, phthalic acid, p-β-oxyethoxybenzoic acid, 2,6-naphthalenedicarboxylic acid, 4,4'-dicarboxydiphenyl, 4,4'-dicarboxybenzophenone, bis(4-carboxyphenyl)ethane, adipic acid, sebacic acid, and cyclohexane-1,4-dicarboxylic acid.

Ethylene glycol is mainly used as a glycol component for preparing the sulfonic acid group-containing copolyester. Besides, there can be used propylene glycol, butanediol, neopentyl glycol, diethylene glycol, cyclohexane dimethanol, ethylene oxide adduct of bisphenol A, polyethylene glycol, polypropylene glycol, polytetramethylene glycol, and the like. Of these materials, it is preferable to use ethylene glycol, propylene glycol, butanediol, neopentyl glycol, diethylene glycol, cyclohexane dimethanol, or the like as a copolymerizable component because miscibility with a polystyrene sulfonate salt is improved.

The polyester resin may be a modified polyester copolymer, such as a block copolymer or a graft copolymer, which is modified with polyester, urethane, or epoxy, or the like. In the present embodiment, a resin other than the polyester resin may be further added to the adhesion-enhancing treatment layer 12 to improve adhesion of the adhesion-enhancing treatment layer 12 to the substrate layer 11 and the adhesive layer 13. Such a resin may, for example, be a urethane resin, an acrylic resin, or the like.

<Acrylic Resin>

Examples of a usable monomer component forming an acrylic resin include: alkyl acrylate, and alkyl methacrylate (alkyl groups include a methyl group, ethyl group, n-propyl group, isopropyl group, n-butyl group, isobutyl group, t-butyl group, 2-ethyl hexyl group, lauryl group, stearyl group, cyclohexyl group, phenyl group, benzyl group, and phenylethyl group); hydroxyl group-containing monomers, such as 2-hydroxyethyl acrylate, 2-hydroxyethyl methacrylate, 2-hydroxypropylacrylate, and 2-hydroxypropylmethacrylate; amide group-containing monomers, such as acrylamide, methacrylamide, N-methylacrylamide, N-methylmethacrylamide, N-methylol acrylamide, N-methylol methacrylamide, N,N-dimethylol acrylamide, N-methoxymethylacrylamide, N-methoxymethylmethacrylamide, and N-phenylacrylamide; amino group-containing monomers, such as N,N-diethyl aminoethyl acrylate, and N,N-diethyl aminoethyl methacrylate; epoxy group-containing monomers, such as glycidyl acrylate, and glycidyl methacrylate; carboxyl groups, such as acrylic acid, methacrylic acid, and salts thereof (lithium salt, sodium salt, potassium salt, and the like), monomers containing these salts, and the like. These materials may be used singly, or in combination of two or more for copolymerization. Moreover, these materials may be combined with monomers other than ones mentioned above.

Examples of other monomers that can be used include: epoxy group-containing monomers, such as allyl glycidyl ether; sufonate groups, such as styrene sulfonic acid, vinyl sulfonic acid and salts thereof (lithium salt, sodium salt, potassium salt, ammonium salt, and the like), or monomers containing the salts; carboxyl groups, such as crotonic acid, itaconic acid, maleic acid, fumaric acid, and salts thereof (lithium salt, sodium salt, potassium salt, ammonium salt, and the like), or monomers containing the salts; monomers containing acid anhydrides, such as maleic anhydride and anhydrous itaconic acid; vinyl isocyanate, allyl isocyanate, styrene, vinyl methylether, vinyl ethyl ether, vinyl-tris alkoxysilane, alkylmaleic acid monoester, alkylfumaric acid monoester, acrylonitrile, methacrylonitrile, alkyliconic acid monoester, vinylidene chloride, vinyl acetate, and vinyl chloride. The acrylic resin may be a modified acrylic copolymer, such as a block copolymer or a graft copolymer, which is modified by polyester, urethane or epoxy, or the like.

The acrylic resin used in the present embodiment preferably has a glass transition point (Tg) in the range of 0° C. to 90° C., and more preferably from 10° C. to 80° C., but is not particularly limited to these ranges. A lower Tg may impair adhesion at high temperature and high humidity, while a higher Tg may develop cracks during stretching. Therefore, from the perspective of avoiding these inconveniences, the acrylic resin preferably has a Tg in the above range.

The acrylic resin used in the present embodiment preferably has a weight average molecular weight of 100,000 or more, and more preferably 300,000 or more. A lower weight average molecular weight may impair heat resistance and humidity resistance. In the present embodiment, to improve adhesion of the adhesion-enhancing treatment layer 12 with the substrate layer 11 and the adhesive layer 13, the adhesion-enhancing treatment layer 12 may be permitted to further contain a resin other than the acrylic resin. Such a resin may, for example, be a polyester resin, a urethane resin, or the like.

<Polyurethane Resin>

As the polyurethane resin, an aqueous polyurethane resin is preferred. The aqueous polyurethane resin is preferably of a self-emulsifying type because of having a small particle size and good stability. The aqueous polyurethane resin may have a particle size approximately in the range of 10 nm to 100 nm. The aqueous polyurethane resin used in the present embodiment desirably has a glass transition point (Tg) in the range of 40° C. to 150° C. A Tg of 40° C. or more may tend to sufficiently reduce or prevent the occurrence of blocking while the film is taken up onto a roll after coating. A Tg excessively higher than the drying temperature after coating may make it difficult to form a uniform film, and thus Tg is preferably 150° C. or less.

In the present embodiment, a cross-linking agent may be used together with the aqueous polyurethane resin. The cross-linking agent for the aqueous polyurethane may be a general-purpose water-soluble cross-linking agent, such as a water-soluble epoxy compound. The water-soluble epoxy compound has water solubility and has two or more epoxy groups. Examples of the water-soluble epoxy compound include: polyepoxy compounds obtained by etherification of 2 mol of epichlorohydrin and 1 mol of glycol, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, or neopentyl glycol; and diepoxy compounds obtained by esterification of 2 mol of epichlorohydrin and 1 mol of dicarboxylic acid, such as phthalic acid, terephthalic acid, adipic acid, or oxalic acid. The water-soluble epoxy compound is not limited to these.

Such a water-soluble cross-linking agent forms a cross-link with the aqueous polyurethane resin to improve water resistance and solvent resistance of the coating and also improve adhesion of the adhesion-enhancing treatment layer 12 with the substrate layer 11 and the adhesive layer 13. In the present embodiment, to improve adhesion of the adhesion-enhancing treatment layer 12 with the substrate layer 11 and the adhesive layer 13, the adhesion-enhancing treatment layer 12 may be permitted to further contain a resin other than the urethane resin. Such a resin may, for example, be a polyester resin, an acrylic resin, or the like.

The adhesion-enhancing treatment layer 12 may be formed containing, for example, the resins mentioned above as a main component and a curing agent, such as multifunctional isocyanate, a multifunctional glycidyl compound, or a melamine-based compound. When the adhesion-enhancing treatment layer 12 contains the resins mentioned above as a main component, and a curing agent, such as multifunctional isocyanate, a multifunctional glycidyl compound, or a melamine-based compound, a cross-linking structure can be incorporated into the adhesion-enhancing treatment layer 12 to make the layer strong and hard.

The coating agent used for forming the adhesion-enhancing treatment layer 12 may be solvent based or water based. A dispersible (dispersion) coating agent using a water-based main resin has a large molecular weight and improves intermolecular cohesive force and is thus effective for the adhesion of the adhesion-enhancing treatment layer 12 with the substrate layer 11 and the adhesive layer 13.

The adhesion-enhancing treatment layer 12 preferably has a thickness in the range of 0.02 μm to 0.5 μm, and more preferably 0.04 μm to 0.3 μm. The adhesion-enhancing treatment layer 12 having a thickness of 0.02 μm or more tends to facilitate formation of a uniform adhesion-enhancing treatment layer 12 and achieve even better adhesion-enhancing effects. The adhesion-enhancing treatment layer 12 having a thickness of 0.5 μm or less tends to even more improve deep-drawing properties of the packaging material 10.

(Adhesive Layer 13)

The adhesive layer 13 adheres the substrate layer 11 to the metal foil layer 14. The adhesive layer 13 adheres to the substrate layer 11 via the adhesion-enhancing treatment layer 12. The adhesive layer 13 has an adhesive force needed to firmly adhere the substrate layer 11 to the metal foil layer 14 and also has conformability (ability to reliably form the adhesive layer 13 on a member without separation, even when the member is deformed, stretched or contracted) for reducing or preventing breaking of the metal foil layer 14 by the substrate layer 11 during cold forming.

As an adhesive forming the adhesive layer 13, there can be used a two-part curing type polyurethane adhesive comprising, for example, a main resin made of a polyol such as a polyester polyol, a polyether polyol, an acrylic polyol or the like, and a curing agent such as an aromatic or aliphatic isocyanate. In this adhesive, the molar ratio (=NCO/OH) of the isocyanate group of the curing agent to the hydroxyl group of the main resin is preferably in the range of 1 to 10, and more preferably 2 to 5.

After coating, the polyurethane adhesive is aged at 40° C. for 4 days or longer, for example. The aging advances reaction of the hydroxyl group of the base resin with the isocyanate group of the curing agent, allowing more firm adhesion of the substrate layer 11 to the metal foil layer 14.

From the perspective of obtaining desired adhesive strength, conformability, processability, and the like, the thickness of the adhesive layer 13 is preferably in the range of 1 μm to 10 μm, and more preferably 2 μm to 6 μm.

(Metal Foil Layer 14)

Various types of metal foil such as of aluminum and stainless steel may be used as the metal foil layer 14. The metal foil layer 14 is preferably aluminum foil, from the perspective of processability, such as moisture resistance, ductility and malleability, and cost. The aluminum foil may be generally used soft aluminum foil, but aluminum foil containing iron is preferred for exhibiting good pinhole resistance, ductility and malleability when formed.

The aluminum foil containing iron (100 mass %) preferably has an iron content in the range of 0.1 mass % to 9.0 mass %, and more preferably 0.5 mass % to 2.0 mass %. The iron content of 0.1 mass % or more may lead to obtaining a packaging material 10 having better pinhole resistance, and ductility and malleability. When the content of iron is 9.0 mass % or less, a packaging material 10 having much better flexibility can be obtained.

From the perspective of imparting desired ductility and malleability during forming, an annealed soft aluminum foil (e.g., aluminum foil made of the material 8021 or 8079 according to the Japanese Industrial Standards) is even more preferred as the aluminum foil.

The metal foil used for the metal foil layer 14 is preferably degreased, for example, to obtain desired electrolyte resistance. To simplify the production process, the metal foil preferably has a surface that is not etched. The degreasing treatment, for example, may be of wet or dry type. However, dry degreasing treatment is preferred from the perspective of simplifying the production process.

The dry degreasing treatment may, for example, be one that can extend treatment time in the step of annealing the metal foil. Adequate electrolyte resistance may be obtained with degreasing treatment that is carried out simultaneously with the annealing treatment for softening the metal foil.

The dry degreasing treatment may be one, such as flame treatment or corona treatment, that is other than the annealing treatment. Further, the dry degreasing treatment may be one that oxidatively decomposes and removes contaminants using active oxygen generated by irradiating the metal foil with ultraviolet rays at a specific wavelength.

For example, the wet degreasing treatment may be an acid degreasing treatment, alkaline degreasing treatment, or the like. For example, the acid used for the acid degreasing treatment may be an inorganic acid, such as sulfuric acid, nitric acid, hydrochloric acid, or hydrofluoric acid. These acids may be used singly or in combination of two or more. For example, the alkali used for the alkaline degreasing treatment may be sodium hydroxide having strong etching effects. Alkaline degreasing treatment may be performed using a material containing a weakly alkaline material, and a surfactant or the like. The wet degreasing treatment set forth above may be performed, for example, through immersion or spraying.

From the perspective of barrier properties, pinhole resistance, and processability, the metal foil layer 14 preferably has a thickness in the range of 9 μm to 200 μm, more preferably 15 μm to 150 μm, and even more preferably 15 μm to 100 μm. The metal foil layer 14 with a thickness of 9 μm or more may be able to make the layer less fragile even when stress is applied thereto during forming. The metal foil layer 14 with a thickness of 200 μm or less may be able to minimize the increase in mass of the packaging material and minimize the decrease in weight energy density of the power storage device.

(Anticorrosion Treatment Layers 15a and 15b)

The anticorrosion treatment layers 15a and 15b reduce or prevent corrosion of the metal foil layer 14 due to the electrolyte or hydrofluoric acid produced by reaction of the electrolyte with water. The anticorrosion treatment layer 15a increases the adhesive force between the metal foil layer 14 and the adhesive layer 13. The anticorrosion treatment layer 15b increases the adhesive force between the metal foil layer 14 and the sealant adhesive layer 16. The anticorrosion treatment layers 15a and 15b may be identically formed or may be differently formed. FIG. 1 illustrates the case where the anticorrosion treatment layers are respectively formed on both surfaces of the metal foil layer 14. However, the anticorrosion treatment layer may be formed on at least one surface of the metal foil layer 14.

The anticorrosion treatment layers 15a and 15b can be formed by, for example, performing degreasing treatment, hydrothermal conversion treatment, anodizing treatment, chemical conversion treatment, or coating-type anticorrosion treatment of applying a coating agent having anticorrosion ability, for layers serving as base materials for the anticorrosion treatment layers 15a and 15b, or a combination of these treatments.

Of the treatments mentioned above, degreasing treatment, hydrothermal conversion treatment, and anodizing treatment, the hydrothermal conversion treatment and anodizing treatment in particular are treatments for dissolving a surface of the metal foil (aluminum foil) by use of a treatment agent, and forming a metal compound having good anticorrosion properties (aluminum compound (boehmite, alumite)). In this sense, these treatments may be embraced within the definition of chemical conversion treatments because they provide a co-continuous structure that is formed covering from the metal foil layer 14 to the anticorrosion treatment layers 15a and 15b.

The degreasing treatment may be acid degreasing treatment, or alkaline degreasing treatment. The acid degreasing treatment may be one using the inorganic acid mentioned above, such as sulfuric acid, nitric acid, hydrochloric acid, or hydrofluoric acid, singly, or using acid obtained by mixing them, or the like. Use of an acid degreasing agent, as the acid degreasing treatment, obtained by dissolving a fluorine-containing compound, such as monosodium ammonium bifluoride, with the above inorganic acid can not only exert the effects of degreasing the metal foil layer 14, but also form a passive-state metal fluoride, and is thus effective in terms of hydrofluoric acid resistance. The alkaline degreasing treatment may be one using sodium hydroxide, or the like.

The hydrothermal conversion treatment may, for example, be boehmite treatment using boehmite obtained by immersing the metal foil layer 14 in boiling water with triethanolamine added thereto. The anodizing treatment may, for example, be alumite treatment. Examples of the chemical conversion treatment mentioned above include chromate treatment, zirconium treatment, titanium treatment, vanadium treatment, molybdenum treatment, calcium phosphate treatment, strontium hydroxide treatment, cerium treatment, ruthenium treatment, or treatment that is a combination of two or more of these treatments. When performing the hydrothermal conversion treatment, anodizing treatment or chemical conversion treatment, the degreasing treatment described above is preferably performed in advance.

The chemical conversion treatment is not limited to a wet type, but may be one, for example, for mixing agents used for the treatment with a resin component, followed by coating. The anticorrosion treatment may preferably be of a coating type chromate treatment because it maximizes the anticorrosion effect and is convenient for liquid waste disposal.

The coating agent used in the coating type anticorrosion treatment of applying a coating agent having anticorrosion ability may be one which contains at least one selected from the group consisting of a rare earth element oxide sol, an anionic polymer and a cationic polymer. Especially, a method using a coating agent containing a rare earth element oxide sol is preferred.

The method using a coating agent containing a rare earth element oxide sol is a pure coating type anticorrosion treatment. Use of this method can impart anticorrosion effects to the metal foil layer 14 even when generally used coating methods are used. The layer formed by using a rare earth element oxide sol has anticorrosion effects (inhibitor effects) on the metal foil layer 14, and thus is a favorable material from an environmental aspect.

The rare earth element oxide sol contains a liquid dispersion medium in which microparticles (e.g., particles having a mean particle size of 100 nm or less) of rare earth element oxide are dispersed. The rare earth element oxide may be a cerium oxide, an yttrium oxide, a neodymium oxide, a lanthanum oxide, or other oxides. Of these oxides, a cerium oxide is preferred. Thus, adhesion with the metal foil layer 14 is even more improved. Examples of the liquid dispersion medium used for the rare earth element oxide sol include various solvents, such as, water, alcoholic solvents, hydrocarbon-based solvents, ketone-based solvents, ester-based solvents, and ether-based solvents. Of these mediums, water is preferred. The anticorrosion treatment layers 15a and 15b may contain the rare earth element oxides singly or in combination of two or more.

To stabilize dispersion of the rare earth element oxide particles, the rare earth element oxide sol preferably contains a dispersion stabilizer, including an inorganic acid, such as nitric acid, hydrochloric acid, or phosphoric acid, an organic acid, such as acetic acid, malic acid, ascorbic acid, or lactic acid, or a salt of these acids. Of these dispersion stabilizers, phosphoric acid or phosphate in particular is preferably used. In addition to stabilizing dispersion of the rare earth element oxide particles, use of the stabilizer achieves such effects as improving adhesion to the metal foil layer 14 with the chelating ability of phosphoric acid in the usage of the packaging material for a lithium ion battery, imparting electrolyte resistance by trapping the metal ions eluted due to the influence of hydrofluoric acid (forming a passive state), improving cohesive force of the rare earth element oxide layer due to the ease of developing dehydration condensation of phosphoric acid even at low temperatures, and the like. Examples of the phosphoric acid or the phosphate used as the dispersion stabilizer include orthophosphoric acid, pyrophosphoric acid, metaphosphoric acid, alkali metal salt or ammonium salt thereof, and the like. Of these materials, a condensed phosphoric acid, such as trimetaphosphoric acid, tetrametaphosphoric acid, hexametaphosphoric acid, and ultrametaphosphoric acid, or alkali metal salt or ammonium salt thereof is preferred in terms of allowing the packaging material for a lithium ion battery to express its functions. In particular, from the perspective of dry film formability (drying capacity, heat capacity) when forming a layer containing a rare earth oxide through various types of coating method using a coating composition containing the rare earth element oxide sol, an agent having good reactivity at low temperatures is preferred. Specifically, sodium salt is preferred because of its good dehydration condensation properties at low temperatures. As the phosphate, a water-soluble salt is preferred. The anticorrosion treatment layers 15a and 15b may contain phosphoric acids or phosphates singly or in combination of two or more.

The rare earth element oxide sol preferably contains the phosphoric acid or the salt thereof in an amount of 1 part by mass or more, and more preferably 5 parts by mass or more, relative to 100 parts by mass of the rare earth element oxide. A content of 1 part by mass or more can well stabilize the sol and easily satisfy the functions as a packaging material for a lithium ion battery. The upper limit of the phosphoric acid or the salt thereof to be contained relative to 100 parts by mass of the rare earth element oxide may be in the range not lowering the functions of the rare earth element oxide sol, and may preferably be 100 parts by mass or less, more preferably 50 parts by mass or less, and even more preferably 20 parts by mass or less, relative to 100 parts by mass of the rare earth element oxide.

The layer formed of the rare earth element oxide sol is an aggregate of inorganic particles and therefore the cohesive force of the layer is low even after undergoing dry curing. To compensate the cohesive force of this layer, this layer is preferably complexed with an anionic polymer.

The anionic polymer may be a polymer having a carboxy group. For example, poly (meth)acrylic acid (or a salt thereof), or a copolymer containing poly (meth)acrylic acid as a main component may be used. Examples of the copolymerization component of the copolymer include: alkyl (meth)acrylate-based monomers (the alkyl groups including methyl group, ethyl group, n-propyl group, i-propyl group, n-butyl group, i-butyl group, t-butyl group, 2-ethylhexyl group, and cyclohexyl group); amide group-containing monomers, such as (meth)acrylamide, N-alkyl(meth)acrylamide, N,N-dialkyl(meth)acrylamide (the alkyl groups including a methyl group, an ethyl group, an n-propyl group, an i-propyl group, an n-butyl group, an i-butyl group, a t-butyl group, a 2-ethylhexyl group, and a cyclohexyl group), N-alkoxy(meth)acrylamide, N,N-dialkoxy(meth)acrylamide (the alkoxy groups including a methoxy group, an ethoxy group, a butoxy group, and an isobutoxy group), N-methylol(meth)acrylamide, and N-phenyl(meth)acrylamide; hydroxyl group-containing monomers, such as 2-hydroxyethyl(meth)acrylate and 2-hydroxypropyl(meth)acrylate; glycidyl group-containing monomers, such as glycidyl (meth)acrylate and allyl glycidyl ether; silane-containing monomers, such as (meth)acryloxypropyl trimethoxysilane and (meth)acryloxypropyl triethoxysilane; and isocyanate group-containing monomers, such as (meth)acryloxypropyl isocyanate. The examples also include styrene, α-methylstyrene, vinyl methyl ether, vinyl ethyl ether, maleic acid, alkyl maleate monoester, fumaric acid, alkyl fumarate monoester, itaconic acid, alkyl itaconate monoester, (meth) acrylonitrile, vinylidene chloride, ethylene, propylene, vinyl chloride, vinyl acetate, and butadiene.

The anionic polymer improves stability of the anticorrosion treatment layers 15a and 15b (oxide layers) obtained using the rare earth element oxide sol. The improvement is achieved by the effect of protecting the hard and brittle oxide layers with an acrylic resin component, and the effect of capturing ionic contamination (particularly, sodium ion) derived from the phosphate contained in the rare earth oxide sol (cation catcher). Specifically, when alkali metal ions or alkaline earth metal ions, such as of sodium in particular, are contained in the anticorrosion treatment layers 15a and 15b obtained using the rare earth element oxide sol, the anticorrosion treatment layers 15a and 15b easily deteriorate starting from the ion-containing site. Accordingly, by stabilizing the sodium ions or the like contained in the rare earth oxide sol using the anionic polymer, durability of the anticorrosion treatment layers 15a and 15b is improved.

The anticorrosion treatment layers 15a and 15b produced by combining the anionic polymer with the rare earth element oxide sol have anticorrosion ability equivalent to that of the anticorrosion treatment layers 15a and 15b formed by applying chromate treatment to the metal foil layer 14. The anionic polymer preferably has a structure in which a substantially water-soluble polyanionic polymer is cross-linked. For example, the cross-linking agent used for forming this structure may be a compound having an isocyanate group, a glycidyl group, a carboxy group, or an oxazoline group. Moreover, a cross-linking site having a siloxane bond may be introduced by using a silane coupling agent.

Examples of the compound having an isocyanate group include: diisocyanates such as tolylene diisocyanate, xylylene diisocyanate or its hydrogenated products, hexamethylene diisocyanate, 4,4'-diphenylmethane diisocyanate or its hydrogenated products, and isophorone diisocyanate; polyisocyanates including adduct forms obtained by reaction of these isocyanates with polyhydric alcohols such as trimethylolpropane, biuret forms obtained by reaction of the isocyanates with water, or isocyanurate forms that are trimers of the isocyanates; and blocked polyisocyanates obtained by blocking these polyisocyanates with alcohols, lactams, oximes or the like.

Examples of the compound having a glycidyl group include: epoxy compounds obtained by reaction of glycols, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, and neopentyl glycol, with epichlorohydrin; epoxy compounds obtained by reaction of polyhydric alcohols, such as glycerine, polyglycerine, trimethylolpropane, pentaerythritol, and sorbitol, with epichlorohydrin; and epoxy compounds obtained by reaction of dicarboxylic acids, such as phthalic acid, terephthalic acid, oxalic acid, and adipic acid, with epichlorohydrin.

The compounds having a carboxy group include various aliphatic or aromatic dicarboxylic acids, and even include poly(meth)acrylic acids, or alkali (earth) metal salts of poly(meth)acrylic acids.

Examples of the compounds having an oxazoline group include low molecular weight compounds having two or more oxazoline units. Alternatively, if polymerizable monomers such as isopropenyl oxazoline are used, the compounds may be ones obtained by copolymerizing acrylic monomers such as (meth)acrylic acid, (meth)acrylic alkyl esters, hydroxyalkyl (meth)acrylates, and the like.

The silane coupling agents may be γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β-(aminoethyl)-γ-aminopropyltrimethoxysilane, or γ-isocyanatopropylethoxysilane. Especially, from the perspective of reactivity with an anionic polymer, an epoxysilane, an aminosilane or an isocyanate silane is preferred.

The amount of cross-linking agent to be contained is preferably in the range of 1 part by mass to 50 parts by mass, and more preferably from 10 parts by mass to 20 parts by mass, relative to 100 parts by mass of the anionic polymer.

When the ratio of the cross-linking agent is 1 part by mass or more relative to 100 parts by mass of the anionic polymer, a cross-linking structure is easily adequately formed. When the ratio of the crosslinking agent is not more than 50 parts by mass relative to 100 parts by mass of the anionic polymer, the pot life of the coating solution improves.

The method of cross-linking the anionic polymer is not limited to one using a cross-linking agent, but may be one using a titanium or zirconium compound to form ionic crosslinkage. The coating composition forming the anticorrosion treatment layer 15a may be applied to these materials.

The anticorrosion treatment layers 15a and 15b described above are formed as chemical conversion treatment layers on the metal foil layer 14 through chemical conversion treatment typified by chromate treatment. To form a graded structure with the metal foil layer 14, the metal foil layer 14 is treated, in the chemical conversion treatment, with a chemical conversion treatment agent, which particularly contains hydrofluoric acid, hydrochloric acid, nitric acid, sulfuric acid or a salt thereof. The treated metal foil layer 14 is then reacted with a chromium or non-chromium compound to form the chemical conversion treatment layers thereon. However, the chemical conversion treatment using the chemical conversion treatment agent containing acid may entail degradation of the work environment and corrosion of the coating apparatus.

In contrast, the anticorrosion treatment layers 15a and 15b of coating type as mentioned above do not have to form a graded structure with the metal foil layer 14, unlike in the chemical conversion treatment typified by chromate treatment. Accordingly, the nature of the coating agent should not be restricted to acidity, alkalinity, neutrality, or the like, and accordingly a good work environment is achieved. Since an alternative to chromate treatment using a chromium compound is sought in terms of environmental health, from this perspective as well, the anticorrosion treatment layers 15a and 15b of coating type are preferred.

As necessary, the anticorrosion treatment layers 15a and 15b may have a laminated structure in which a cationic polymer is further laminated. The cationic polymer may be polyethyleneimine, an ionic polymer complex made of a polyethyleneimine and a polymer having carboxylic acid, a primary amine-grafted acrylic resin having a primary amine grafted to a main acrylic backbone, polyallylamine or derivatives thereof, an aminophenol resin, or the like.

Examples of the "polymer having carboxylic acid" forming the ionic polymer complex include polycarboxylic acid (salt), a copolymer produced by introducing a comonomer into polycarboxylic acid (salt), and polysaccharides having a carboxy group. Examples of the polycarboxylic acid (salt) include polyacrylic acid, and ionic salts thereof. Examples of the polysaccharides having a carboxy group include carboxymethylcellulose, and ionic salts thereof. The ionic salt may be an alkali metal salt, alkaline earth metal, or the like.

The primary amine-grafted acrylic resin is a resin having a primary amine grafted to a main acrylic backbone. The acrylic main backbone includes various monomers, such as poly(meth)acrylic acid, used for the acrylic polyol mentioned above. The primary amine grafted to the acrylic main backbone may be ethyleneimine, or the like.

The polyallylamine or a derivative thereof may be a homopolymer or a copolymer of allylamine, allylamine amide sulfate, diallylamine, dimethylallylamine, or the like. These amines may be used in the form of free amine, or may be stabilized by acetic acid or hydrochloric acid. The copolymer may contain maleic acid, sulfur dioxide, or the like as a component. A primary amine may be partially methoxylated to impart thermal cross-linking properties thereto for use as a type of amine. These cationic polymers may be used singly or in combination of two or more. Of these cationic polymers, at least one selected from the group consisting of polyallylamine and a derivative thereof is preferred.

The cationic polymer is preferably used in combination with a cross-linking agent having a functional group that can react with amine/imine, such as a carboxy group or a glycidyl group. The cross-linking agent to be used in combination with the cationic polymer may be a polymer having carboxylic acid that forms an ionic polymer complex with polyethyleneimine, of which examples include: polycarboxylic acid (salt), such as polyacrylic acid or ionic salt thereof; a copolymer produced by introducing a comonomer thereinto; polysaccharides having a carboxy group, such as carboxymethylcellulose or ionic salt thereof.

In the present embodiment, a cationic polymer is described as a component forming the anticorrosion treatment layers 15a and 15b. This is based on an intensive investigation using various compounds for finding those compounds which impart required electrolyte resistance and hydrofluoric acid resistance to the packaging material for a lithium ion battery. As a result, cationic polymers have been found to be compounds that can impart electrolyte resistance and hydrofluoric acid resistance to the packaging material. This is estimated to be because fluorine ions are captured by the cationic group (anion catcher) and the metal foil layer 14 is prevented from being damaged. The cationic polymer is most preferred, from the perspective of improving adhesion between the anticorrosion treatment layer 15b and the sealant adhesive layer 16. The cationic polymer, which is water soluble similarly to the anionic polymer mentioned above, can contribute to improving water resistance by forming a cross-linking structure using the cross-linking agent mentioned above. Thus, use of the cationic polymer also enables formation of a cross-linking structure. Accordingly, when the rare earth oxide sol is used for forming the anticorrosion treatment layers 15a and 15b, the cationic polymer may be used as the protective layers instead of the anionic polymer.

From the above description, combinations of the above coating type anticorrosion treatments may be (1) rare earth oxide sol alone, (2) anionic polymer alone, (3) cationic polymer alone, (4) rare earth oxide sol+anionic polymer (laminated composite), (5) rare earth oxide sol+cationic polymer (laminated composite), (6) (rare earth oxide sol+ anionic polymer: laminated composite)/cationic polymer (multilayer), (7) (rare earth oxide sol+cationic polymer: laminated composite)/anionic polymer (multilayer), and the like. Of these combinations, (1) and (4) through (7) are preferred, and (4) through (7) are more preferred. For the anticorrosion treatment layer 15a, (6) is particularly preferred because an anticorrosion effect and an anchor effect (adhesion improvement effect) are achieved by a single layer. For the anticorrosion treatment layer 15b, (6) and (7) are particularly preferred because it is easier to maintain the sealant layer 17 side electrolyte resistance. However, the present embodiment is not limited to the above combinations. The anticorrosion treatment may be selected as follows as an example. Specifically, when the sealant adhesive layer 16 is formed of a modified polyolefin resin, the cationic polymer is designed to be provided on the surface contacting the sealant adhesive layer 16 (e.g., configurations (5) and (6)) because the cationic polymer is a material that is most preferred in terms of good adhesion with a modified polyolefin resin that will be mentioned in the section of the sealant adhesive layer 16 below.

The anticorrosion treatment layers 15a and 15b should not be limited to the layers described above. For example, they may be formed by using an agent produced by adding phosphoric acid and a chromium compound to a resin binder (aminophenol resin etc.), as in a coating type chromate based on a known technique. Use of this treatment agent enables formation of a layer that is both corrosion-resistant and adhesive. To improve adhesion, the chemical conversion treatment layer described above (the layer formed through degreasing treatment, hydrothermal conversion treatment, anodizing treatment, chemical conversion treatment, or a combination thereof) may be treated in a composite manner using the cationic polymer and/or the anionic polymer mentioned above. Alternatively, using these treatments in combination, the cationic polymer and/or the anionic polymer may be laminated as a multilayer structure. While the stability of the coating agent has to be considered, a layer that is both corrosion-resistant and adhesive can be achieved by using a coating agent that is a one-liquid product of the rare earth oxide sol and the cationic polymer or the anionic polymer, prepared in advance.

The anticorrosion treatment layers 15a and 15b preferably have mass per unit area in the range of 0.005 $g/m^2$ to 0.200 $g/m^2$, and more preferably 0.010 $g/m^2$ to 0.100 $g/m^2$. With the mass per unit area of 0.005 $g/m^2$ or more, the metal foil layer 14 can be easily made corrosion-resistant. The mass per unit area exceeding 0.200 $g/m^2$ will saturate the corrosion resistance and make it remain substantially unchanged. In contrast, when a rare earth oxide sol is used and the coating is thick, thermal curing will be insufficient when dried and the cohesive force may decrease. Although the above description has been given using mass per unit area, the specific gravity, if available, can be used in terms of thickness.

From the perspective of anticorrosive and anchoring functions, the anticorrosion treatment layers 15a and 15b may each preferably have a thickness, for example, in the range of 10 nm to 5 μm, and more preferably 20 nm to 500 nm.

(Sealant Adhesive Layer 16)

The sealant adhesive layer 16 adheres the sealant layer 17 to the metal foil layer 14 on which the anticorrosion treatment layer 15b is formed. The packaging material 10 is roughly categorized into a heat lamination structure and a dry lamination structure, depending on the adhesive component forming the sealant adhesive layer 16.

The adhesive component forming the sealant adhesive layer 16 in the heat lamination structure is preferably an acid modified polyolefin-based resin obtained by graft-modifying a polyolefin-based resin with acid. The acid modified polyolefin-based resin, which has a polar group introduced into part of the nonpolar polyolefin-based resin, can firmly adhere to both the sealant layer 17 formed of a nonpolar polyolefin-based resin film or the like, and the anticorrosion treatment layer 15b mostly having polarity. Use of the acid modified polyolefin-based resin improves resistance of the packaging material 10 to the contents, such as the electrolyte, and easily prevents lowering of the adhesive force due to deterioration of the sealant adhesive layer 16 which would be caused by hydrofluoric acid being produced inside the battery.

Examples of the polyolefin-based resin for the acid modified polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. The polyolefin resin may also be a copolymer obtained by copolymerizing polar molecules such as of acrylic acid or methacrylic acid with those materials mentioned above, a polymer such as cross-linked polyolefin, or the like. The acid for modifying the polyolefin-based resin may be carboxylic acid, an epoxy compound, acid anhydride, or the like, and maleic anhydride is preferred. The acid modified polyolefin-based resins used for the sealant adhesive layer 16 may be used singly or in combination of two or more.

The sealant adhesive layer 16 of the heat lamination structure is formed by extruding the adhesive component mentioned above with an extruder. The sealant adhesive layer 16 of the heat lamination structure preferably has a thickness in the range of 2 µm to 50 µm.

The adhesive component forming the sealant adhesive layer 16 of the dry lamination structure may be ones, for example, similar to those mentioned for the adhesive layer 13. In this case, to prevent or reduce swelling due to the electrolyte, and hydrolysis due to the hydrofluoric acid, the composition of the adhesive is preferably designed so as to contain a main resin with a backbone not easily hydrolyzed, and improve cross-linking density.

To improve cross-linking density, another substance may be added to the adhesive, the substance being, for example, a dimer fatty acid, an ester or a hydrogenated product of the dimer fatty acid, a reduced glycol of the dimer fatty acid, or a reduced glycol of the ester or the hydrogenated product of the dimer fatty acid. The dimer fatty acid may be obtained by dimerizing various unsaturated fatty acids, and can have a structure, for example, of acyclic type, monocyclic type, polycyclic type, and aromatic ring type.

The fatty acid as a starting material of the dimer fatty acid is not particularly limited. Using such dimer fatty acid as an indispensable component, a dibasic acid such as that used for ordinary polyester polyol may be introduced. The curing agent that can be used for the main resin forming the sealant adhesive layer 16 may, for example, be an isocyanate compound that can also be used as a chain elongation agent for polyester polyol. Thus, cross-linking density of the adhesive coating increases, which leads to improving solubility and swelling properties. Furthermore, substrate adhesion is also expected to be improved due to increase in urethane group concentration.

The sealant adhesive layer 16 having a dry laminate structure has a bonding part such as of an ester group and a urethane group which is easily hydrolysable. Therefore, for usage requiring much higher reliability, an adhesive component having a heat lamination structure is preferably used as the sealant adhesive layer 16. For example, the various curing agents mentioned above may be added to a coating agent that contains a solvent, such as toluene or methylcyclohexane (MCH), in which the acid modified polyolefin resin is dissolved or dispersed, followed by coating and drying to thereby form the sealant adhesive layer 16.

When forming the sealant adhesive layer 16 using extrusion molding, the adhesive resin tends to be oriented in MD (extrusion direction) due to the stress or the like generated during the extrusion molding. In this case, to alleviate the anisotropy of the sealant adhesive layer 16, an elastomer may be added to the sealant adhesive layer 16. As the elastomer to be added to the sealant adhesive layer 16, for example, an olefin-based elastomer, a styrene-based elastomer, or the like may be used.

Third Embodiment

The elastomer preferably has a mean particle size that can improve miscibility of the elastomer with the adhesive resin and improve the effect of alleviating the anisotropy of the sealant adhesive layer 16. Specifically, for example, the elastomer preferably has a mean particle size of 200 nm or less.

The mean particle size of the elastomer is determined, for example, by capturing an enlarged image of a cross section of the elastomer composition using an electron microscope, followed by image analysis for measurement of a mean particle size of the dispersed cross-linked rubber components. The elastomers mentioned above may be used singly or in combination of two or more.

If an elastomer is added to the sealant adhesive layer 16, the amount of addition to the sealant adhesive layer 16 (100 mass %) is preferably, for example, in the range of 1 mass % to 25 mass %, and more preferably 10 mass % to 20 mass %. When the amount of addition of the elastomer is 1 mass % or more, improvement is likely to be achieved in miscibility with the adhesive resin, and also in the effect of alleviating the anisotropy of the sealant adhesive layer 16. When the amount of addition of the elastomer is 25 mass % or less, improvement is likely to be achieved in the effect of preventing or reducing swelling of the sealant adhesive layer 16 due to the electrolyte.

The sealant adhesive layer 16 may, for example, be a dispersed adhesive resin solution obtained by dispersing an adhesive resin in an organic solvent.

The sealant adhesive layer 16, when provided to a heat lamination structure, preferably has a thickness in the range of 2 µm to 50 µm, and more preferably 20 µm to 40 µm. The sealant adhesive layer 16 having a thickness of 2 µm or more can easily obtain adequate adhesion strength between the metal foil layer 14 and the sealant layer 17. The sealant adhesive layer 16 having a thickness of 50 µm or less can easily reduce the amount of water penetrating from an end surface of the packaging material into the battery elements in the interior. The sealant adhesive layer 16, when provided to a dry lamination structure, preferably has a thickness in the range of 1 µm to 5 µm. The sealant adhesive layer 16 having a thickness of 1 µm or more can easily obtain adequate adhesion strength between the metal foil layer 14 and the sealant layer 17. The sealant adhesive layer 16 having a thickness of 5 µm or less can prevent or reduce the occurrence of cracking therein.

(Sealant Layer 17)

The sealant layer 17 imparts sealability to the packaging material 10 when heat sealed, and thus is located on the inside and fused, when the power storage device is assembled. The sealant layer 17 may be a resin film made of a polyolefin-based resin or an acid-modified polyolefin-based resin obtained by graft-modifying a polyolefin-based resin with acid such as maleic anhydride. Of these materials, a polyolefin-based resin is preferred because it improves barrier properties against water vapor and can form the shape of the power storage device without being excessively deformed by heat sealing, and polypropylene is particularly preferred.

Examples of the polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. These polyolefin-based resins may be used singly or in combination of two or more.

To the polypropylenes of the types mentioned above, that is, random polypropylene, homo polypropylene, and block polypropylene, substances may be added such as a low crystallinity ethylene-butene copolymer, a low crystallinity propylene-butene copolymer, terpolymer formed of a three-component copolymer of ethylene, butene, and propylene, an anti-blocking agent (AB agent), such as silica, zeolite, and acrylic resin beads, a slip agent, such as a fatty acid amide, or the like.

The acid-modified polyolefin-based resin includes, for example, those resins which are similar to ones mentioned in the section of the sealant adhesive layer 16.

The sealant layer 17 may be a single layer film or may be a multilayer film, and may be selected according to the required properties. For example, to impart moisture resistance, a multilayer film with interposition of resins, such as an ethylene-cyclic olefin copolymer and polymethylpentene, may be used.

The sealant layer 17 may contain various additives, such as a flame retardant, a lubricant, an anti-blocking agent, an antioxidant, a photostabilizer, and a tackifier.

The sealant layer 17 may be a heat sealable film formed by extrusion. In this case, the orientation of the sealable film tends to conform to the direction of its extrusion. Therefore, from the perspective of alleviating anisotropy of the sealant layer 17 due to orientation, an elastomer may be added to the heat sealable film. With the addition of an elastomer, blushing of the sealant layer 17 is prevented or reduced when the packaging material 10 is cold-formed for formation of a recess.

The elastomer that can be used for forming the sealant layer 17 may be, for example, the same materials as those mentioned as the elastomer forming the sealant adhesive layer 16. When the sealant layer 17 has a multilayer film structure, at least one of the plurality of layers constituting the structure may be ensured to contain the elastomer. For example, when the sealant layer 17 has a three-layer laminated structure of random polypropylene layer/block polypropylene layer/random polypropylene layer, the elastomer may be added to only the block polypropylene layer or only to the random polypropylene layers, or may be added to both the random polypropylene layers and the block polypropylene layer.

The sealant layer 17 preferably has a surface (innermost surface of the packaging material 10) with a static friction coefficient in the range of 0.10 to 0.30. The sealant layer 17 more preferably has a surface with a static friction coefficient in the range of 0.12 to 0.25. With a static friction coefficient being in such a range, deep drawing properties may be improved even more. More specifically, when forming a recess in the packaging material 10 by cold forming, the packaging material 10 is prevented from being stretched more than necessary in side portions and corner portions of the recess where the stretching degree is high. Thus, separation is prevented from occurring between the metal foil layer 14 and the sealant adhesive layer 16, or breakage or blushing due to cracks is prevented from occurring in the sealant layer 17 and the sealant adhesive layer 16.

To ensure a surface of the sealant layer 17 to have a static friction coefficient with the range mentioned above, the sealant layer 17 may be permitted to contain a lubricant, or a lubricant may be applied to the surface of the sealant layer 17. Examples of the lubricant include erucic acid amide, oleic acid amide, lauric acid amide, palmitic acid amide, stearic acid amide, ethylene bis-erucic acid amide, ethylene bis-oleic acid amide, methylene bis-stearic acid amide, ethylene bis-capric acid amide, ethylene bis-lauric acid amide, and ethylene bis-stearic acid amide. When the sealant layer 17 contains a lubricant, the content in the sealant layer 17 (100 mass %) is preferably in the range of 0.001 mass % to 0.5 mass %. When the content of lubricant is 0.001 mass % or more, blushing of the sealant layer 17 tends to be even more reduced during cold forming. When the content of lubricant is 0.5 mass % or less, lowering in adhesion strength tends to be minimized for the surface of another layer contacting the surface of the sealant layer 17, and adhesion of the lubricant (deposit of white powder) to the die tends to be prevented.

The sealant layer 17 preferably has a thickness in the range of 10 μm to 100 μm, and more preferably 20 μm to 60 μm. The sealant layer 17 with a thickness of 10 μm or more achieves adequate heat sealing strength. The sealant layer 17 with a thickness of 100 μm or less reduces the amount of water vapor penetrating from an end of the packaging material.

[Method for Producing Packaging Material]

A method of producing the packaging material 10 will be described. The method of producing the packaging material 10 should not be limited to one described below.

For example, the method of producing the packaging material 10 may be one including the following steps S11 to S14.

Step S11: Forming an anticorrosion treatment layer 15a on a surface of a metal foil layer 14 and forming an anticorrosion treatment layer 15b on the other surface of the metal foil layer 14.

Step S12: Forming an adhesion-enhancing treatment layer 12 on a surface of a substrate layer 11 to obtain a laminate.

Step S13: Bonding a surface of the anticorrosion treatment layer 15a to the adhesion-enhancing treatment layer 12 side surface of the laminate, which is on a side opposite to that facing the metal foil layer 14, via the adhesive layer 13.

Step S14: Forming a sealant layer 17 on a surface of the anticorrosion treatment layer 15b, which is on a side opposite to that facing the metal foil layer 14, via a sealant adhesive layer 16.

(Step S11)

At step S11, an anticorrosion treatment layer 15a is formed on a surface of a metal foil layer 14 and an anticorrosion treatment layer 15b is formed on the other surface of the metal foil layer 14. The anticorrosion treatment layers 15a and 15b may be formed separately or simultaneously. Specifically, for example, an anticorrosion treatment agent (base material of the anticorrosion treatment layers) is applied to both surfaces of the metal foil layer 14, sequentially followed by drying, curing, and baking to simultaneously form anticorrosion treatment layers 15a and 15b. Alternatively, an anticorrosion treatment agent may be applied to a surface of the metal foil layer 14, sequentially followed by drying, curing, and baking to form an anticorrosion treatment layer 15a. Then, an anticorrosion treatment layer 15b may be similarly formed on the other surface of the metal foil layer 14. The order of forming the anticorrosion treatment layers 15a and 15b is not particularly limited. The anticorrosion treatment agent may be different or the same between the anticorrosion treatment layers 15a and 15b. As the anticorrosion treatment agent, for example, one used for coating type chromate treatment, or the like may be used. Examples of the method of applying the anticorrosion treatment agent include, but are not particularly limited to, gravure coating, gravure reverse coating, roll coating, reverse roll coating, die coating, bar coating, kiss coating, and comma coating. As the metal foil layer 14, an untreated metal foil layer may be used, or a metal foil layer subjected to wet or dry degreasing treatment may be used.

(Step S12)

At step S12, an adhesion-enhancing treatment layer 12 is formed on a surface of a substrate layer 11. A method of forming the adhesion-enhancing treatment layer 12 will be described herein taking in-line coating as an example. First, an aqueous coating liquid is prepared by dispersing the above resin serving as a main component of the adhesion-enhancing treatment layer 12 with a dispersant. Then, the aqueous coating liquid is applied to a surface of a thermoplastic resin film (base material of the substrate layer 11) that has not yet completed crystalline orientation. Then, the applied aqueous coating liquid is dried, followed by stretching the thermoplastic resin film at least in a uniaxial direction.

Then, the thermoplastic resin film is heat-treated to complete orientation thereof to obtain a laminate with an adhesion-enhancing treatment layer 12 being formed on a surface of the substrate layer 11. The adhesion-enhancing treatment layer 12 formed through such in-line coating contributes to improving adhesion between the substrate layer 11 and the adhesion-enhancing treatment layer 12. Any method may be used for forming an adhesion-enhancing treatment layer 12, not being limited to one described above. In addition, the timing of forming the adhesion-enhancing treatment layer 12 is not limited to the timing shown in the present embodiment.

(Step S13)

At step S13, a surface of the anticorrosion treatment layer 15*a*, which is on a side opposite to that facing the metal foil layer 14, is bonded to the adhesion-enhancing treatment layer 12 side surface of the laminate by dry lamination or the like, using an adhesive that forms an adhesive layer 13. At step S13, the resultant laminate may be aged at a temperature in the range of room temperature to 100° C. to accelerate adhesion. Aging time, for example, is 1 day to 10 days.

(Step S14)

Following step S13, a sealant layer 17 is formed on the laminate including the substrate layer 11, the adhesion-enhancing treatment layer 12, the adhesive layer 13, the anticorrosion treatment layer 15*a*, the metal foil layer 14, and the anticorrosion treatment layer 15*b* laminated in this order. Specifically, a sealant layer 17 is formed on a surface of the anticorrosion treatment layer 15*b*, which is on a side opposite to that facing the metal foil layer 14, via the sealant adhesive layer 16. The sealant layer 17 may be laminated by dry lamination, sandwich lamination, or the like, or may be laminated by coextrusion together with the sealant adhesive layer 16. To improve adhesion, the sealant layer 17 is preferably laminated, for example, by sandwich lamination, or laminated by coextrusion together with the sealant adhesive layer 16, and is more preferably laminated by sandwich lamination.

The packaging material 10 is obtained through the steps S11 to S14 described above. The order of steps in the method of producing the packaging material 10 is not limited to that of the above method in which steps S11 to S14 are sequentially performed. The order of steps may be appropriately changed. For example, step S12 may be followed by step S11.

[Power Storage Device]

A power storage device provided with the packaging material 10 as a container will be described. A power storage device includes: battery elements 1 including electrodes; leads 2 respectively extending from the electrodes; and a container sandwiching and holding the leads 2, and storing the battery elements 1. The container is formed by shaping the packaging material 10, with the sealant layer 17 being on the inside. The container may be formed by joining two packaging materials, with the sealant layers 17 being located face-to-face, and heat-sealing the edge portions of the joined packaging materials 10, or may be obtained by folding a single packaging material so that surfaces are overlaid with each other, and similarly heat-sealing the edge portions of the packaging material 10. The power storage device may have a packaging material 20 as a container. Examples of the power storage device include secondary batteries, such as lithium ion batteries, nickel hydride batteries, and lead batteries, and electrochemical capacitors, such as electric double layer capacitors.

The leads 2 are sandwiched and held, and hermetically sealed in the packaging material 10 forming the container with the sealant layer(s) 17 being on the inside. The leads 2 may be sandwiched and held by the packaging material 10 via a tab sealant.

[Method of Producing Power Storage Device]

Figure 2A:
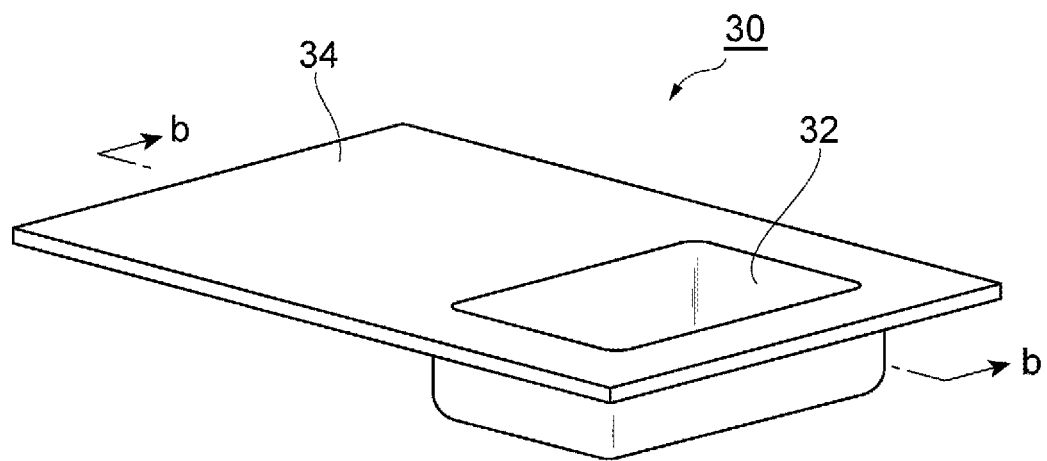
Figure 2B:
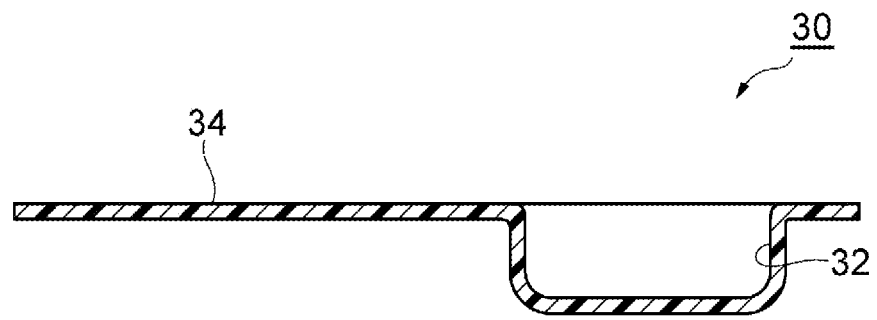

A method of producing the power storage device using the packaging material 10 will be described. The following description is given taking as an example the case of producing a secondary battery 40 using an embossed packaging material 30. FIGS. 2A and 2B are a set of diagrams each illustrating the embossed packaging material 30. FIGS. 3A, 3B, 3C, and 3D are a set of diagrams, each being a perspective view of a process of producing a single-sided battery using the packaging material 10. The secondary battery 40 may be a double-sided battery produced by providing two packaging materials similar to the embossed packaging material 30, and bonding the packaging materials to each other with the alignment being adjusted. The embossed packaging materials 30 may be formed using packaging materials 20.

The secondary battery 40, which is a single-sided battery, can be produced, for example, through the following steps S21 to S25.

Step S21: Preparing a packaging material 10, battery elements 1 including electrodes, and leads 2 extending from the respective electrodes.

Step S22: Forming a recess 32 for disposing the battery elements 1 therein by shaping one half of the packaging material 10 (see FIG. 3A and FIG. 3B).

Figure 3A:
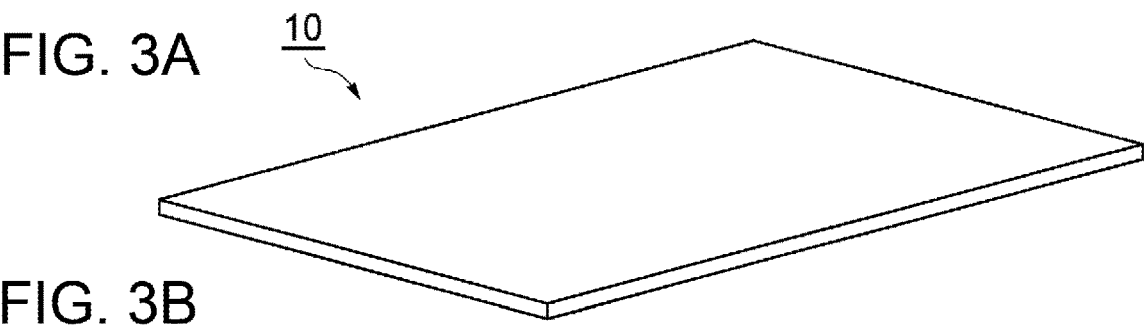
Figure 3B:
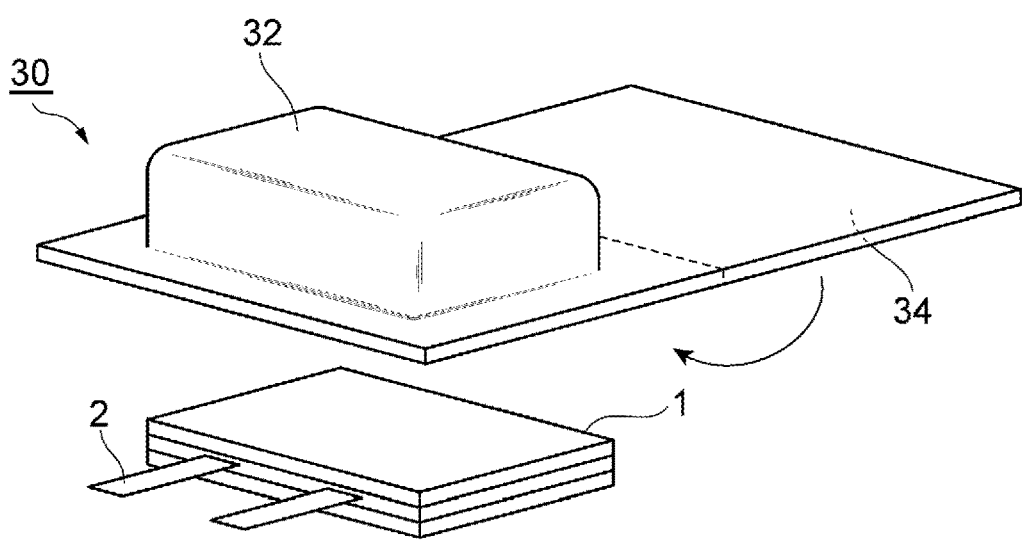
Figure 3C:
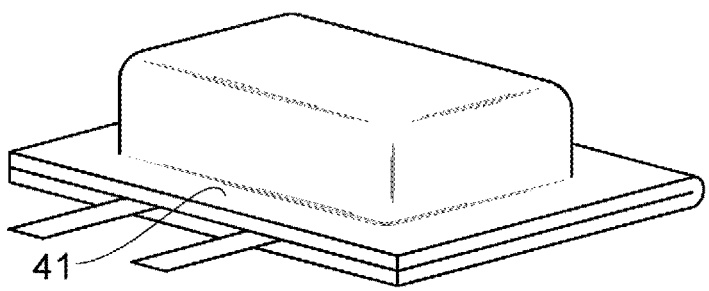
Figure 3D:
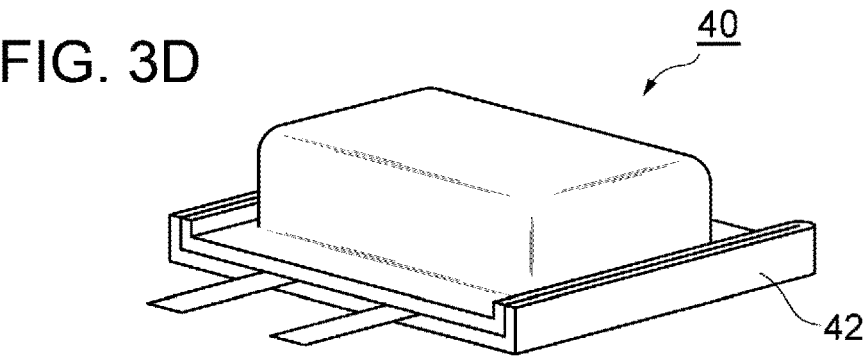

Step S23: Disposing the battery elements 1 in the shaped area (recess 32) of the embossed packaging material 30, folding back the embossed packaging material 30, with surfaces being overlaid, so as to cover the recess 32 with a cover portion 34, and pressure heat-sealing one side of the embossed packaging material 30 so as to sandwich and hold the leads 2 extending from the battery element 1 (FIG. 3B and FIG. 3C).

Step S24: Pressure heat-sealing another side, leaving unsealed a side other than the side sandwiching and holding the leads 2, followed by injecting an electrolyte from the unsealed side and pressure heat-sealing the unsealed side in a vacuum (see FIG. 3C).

Step S25: Trimming the end portions of the pressure heat-sealed sides except for the side sandwiching and holding the leads 2, and bending the end portions toward the shaped area (recess 32) (see FIG. 3D).

(Step S21)

At step S21, a packaging material 10, battery elements 1 including electrodes, and leads 2 extending from the electrodes are prepared. A packaging material 10 is prepared based on the embodiment described above. The battery elements 1 and the leads 2 are not particularly limited, but known battery elements 1 and known leads 2 may be used.

(Step S22)

At step S22, a recess 32 for disposing the battery elements 1 is formed by shaping the sealant layer 17 side of the packaging material 10. The recess 32 has a shape, such as a rectangular shape in plan view, conforming to the shape of the battery elements 1. The recess 32 is formed, for example, by pressing a pressing member having a rectangular pressing surface against part of the packaging material 10 in the thickness direction thereof. The position to be pressed, i.e., the position where the recess 32 is formed, is deviated toward an end portion of the packaging material 10 in a longitudinal direction from the center of the packaging material 10 cut in a rectangle. Thus, the other end portion having no recess 32 is folded back after forming, to provide a cover (cover portion 34).

More specifically, the method of forming the recess 32 may be one using a die (deep drawing). The forming method may be one that uses a negative die and a positive die arranged with a gap equal to or greater than the thickness of the packaging material 10 therebetween, so that the positive die is pressed into the negative die together with the packaging material 10. By adjusting pressing of the positive die, the depth (deep drawing degree) of the recess 32 can be adjusted as desired. With the recess 32 being formed in the packaging material 10, an embossed packaging material 30 is obtained. The embossed packaging material 30 has a shape, for example, as illustrated in FIGS. 2A and 2B. FIG. 2A is a perspective view illustrating the embossed packaging material 30, and FIG. 2B is a longitudinal cross-sectional view illustrating the embossed packaging material 30 of FIG. 2A taken along the line b-b.

(Step S23)

At step S23, the battery elements 1 including a cathode, a separator, an anode, and the like are disposed in the shaped area (recess 32) of the embossed packaging material 30. The leads 2 extending from the battery elements 1 and respectively joined to the cathode and the anode are drawn out of the shaped area (recess 32). The embossed packaging material 30 is then folded back at the approximate center thereof in the longitudinal direction so that surfaces of the sealant layer 17 are located on the inside and overlaid with each other, followed by pressure heat-sealing the side of the embossed packaging material 30 sandwiching and holding the leads 2. The pressure heat sealing is controlled by three conditions of temperature, pressure, and time, which are appropriately set. The pressure heat sealing is preferably performed at a temperature of not less than the temperature of fusing the sealant layer 17.

The thickness of the sealant layer 17 before being heat-sealed is preferably in the range of 40% to 80% relative to the thickness of the leads 2. With the thickness of the sealant layer 17 being not less than the lower limit, the heat-sealing resin tends to adequately fill the end portions of the leads 2. With the thickness of the sealant layer 17 being not more than the upper limit, the thickness of the end portions of the packaging material 10 of the secondary battery 40 can have a moderate thickness, reducing the amount of moisture penetrating from the end portions of the packaging material 10.

(Step S24)

At step S24, the sides of the packaging material are pressure heat-sealed, leaving unsealed a side other than the side sandwiching and holding the leads 2. An electrolyte is then injected from the unsealed side which is then pressure heat-sealed in vacuum. The pressure heat-sealing conditions are similar to those of step S23.

(Step S25)

The end portions of the pressure heat-sealed sides except for the side sandwiching and holding the leads 2 are trimmed and the sealant layer 17 squeezed out of the end portions is removed. The peripheral pressure heat-sealed portions are then turned up toward the recess 32 to form turn-up portions 42, thereby obtaining a secondary battery 40.

Embodiments of a power storage device packaging material and a method of producing the power storage device of the present disclosure have so far been described in detail. However, the present disclosure should not be construed as being limited to these specific embodiments, but may be variously modified and changed within the spirit of the present invention recited in the claims.

EXAMPLES

In the following, the present disclosure will be described in more detail by way of examples. However, the present disclosure should not be limited to the following examples.

(Preparation of Substrate Layer)

As the substrate layer 11, polyester films having the properties shown in Table 1 (all have a thickness of 25 μm) were used. Piercing strength was measured according to the method prescribed by JIS 1707. More specifically, using a probe with a diameter of 1.0 mm and a tip radius of 0.5 mm, piercing strength was measured at five points at a speed of 50 mm/min, and an average of the piercing strengths at five points was taken to be a piercing strength.

In Table 1, ΔA is a value expressed by Formula (1) below, $F50^{160}$ indicates a 50% elongation stress after heat treatment at 160° C., and $F50^{200}$ indicates a 50% elongation stress after heat treatment at 200° C.

$$\Delta A = \text{(break elongation after 160° C. heat treatment)} - \text{(break elongation before 160° C. heat treatment)} \quad (1)$$

Break elongation and 50% elongation stress were measured as follows. That is, polyester films each cut into an A4 size were heated for 30 minutes in an oven kept at a selected heat treatment temperature (160° C. or 200° C.) and then tensile tests (test piece shape: dumbbell No. 5 according to JIS K7127, length between chucks: 75 mm, gauge length: 25 mm, test speed: 50 mm/min) were performed at 23° C. in four directions (0° (MD), 45°, 90° (TD), 135°) of the substrate layer. Measurements in the four directions were then averaged to calculate break elongation and 50% elongation stress in the present embodiment. It should be noted that the break elongation is calculated as follows.

$$\text{Break elongation (\%)} = \{(\text{Gauge length at break} - \text{Gauge length before measurement})/\text{Gauge length before measurement}\} \times 100$$

TABLE 1

| | Polyester Film No. | Piercing strength [N/μm] | Break Elongation [%] | | | ΔA [%] | $F150^{160}$ (MPa) | $F50^{200}$ [MPa] |
| | | | Before heat treatment | After 160° C. heat treatment | After 200° C. heat treatment | | | |
|---|---|---|---|---|---|---|---|---|
| Example 1 | A-1 | 0.72 | 74.2 | 111.5 | 154.0 | 37.3 | 126.9 | 103.7 |
| Example 2 | A-2 | 0.67 | 74.6 | 100.5 | 139.2 | 25.9 | 133.7 | 107.3 |

TABLE 1-continued

| | Polyester Film No. | Piercing strength [N/μm] | Break Elongation [%] | | | ΔA [%] | F150$^{160}$ (MPa) | F50$^{200}$ [MPa] |
| | | | Before heat treatment | After 160° C. heat treatment | After 200° C. heat treatment | | | |
|---|---|---|---|---|---|---|---|---|
| Example 3 | A-3 | 0.70 | 69.8 | 88.1 | 121.9 | 18.3 | 147.6 | 118.8 |
| Example 4 | A-4 | 0.64 | 76.9 | 90.0 | 108.1 | 13.1 | 144.7 | 130.2 |
| Example 5 | A-5 | 0.76 | 73.4 | 121.9 | 162.3 | 48.5 | 116.7 | 98.1 |
| Example 6 | A-6 | 0.60 | 91.0 | 102.4 | 115.5 | 11.4 | 157.4 | 150.7 |
| Example 7 | A-3 | 0.70 | 69.8 | 88.1 | 121.9 | 18.3 | 147.6 | 118.8 |
| Example 8 | A-3 | 0.70 | 69.8 | 88.1 | 121.9 | 18.3 | 147.6 | 118.8 |
| Example 9 | A-3 | 0.70 | 69.8 | 88.1 | 121.9 | 18.3 | 147.6 | 118.8 |
| Example 10 | A-3 | 0.70 | 69.8 | 88.1 | 121.9 | 18.3 | 147.6 | 118.8 |
| Example 11 | A-7 | 0.74 | 81.1 | 131.0 | 198.7 | 49.9 | 90.8 | 71.5 |
| Example 12 | A-8 | 0.77 | 83.6 | 136.1 | 204.3 | 52.5 | 83.6 | 69.0 |
| Comparative Example 1 | A-9 | 0.58 | 89.6 | 97.3 | 108.8 | 7.7 | 164.1 | 152.8 |
| Comparative Example 2 | A-10 | 0.47 | 81.7 | 88.6 | 95.9 | 6.9 | 166.7 | 153.3 |
| Comparative Example 3 | A-11 | 0.52 | 124.0 | 132.7 | 140.8 | 8.7 | 85.8 | 65.1 |
| Comparative Example 4 | A-12 | 0.30 | 114.6 | 115.8 | 119.5 | 1.2 | 73.8 | 72.1 |
| Comparative Example 5 | A-13 | 0.55 | 125.1 | 138.3 | 156.2 | 13.2 | 68.5 | 62.2 |

(Preparation of Coating Agent for Forming Adhesion-Enhancing Treatment Layer)

A coating agent for forming an adhesion-enhancing treatment layer having the following composition was prepared.

Coating agent: Self-emulsifying polyisocyanate "Aquanate 100", manufactured by Nippon Polyurethane Industry Co., Ltd., and spherical silica microparticles "Seahostar KE-P30" (average particle size of 0.3 μm), manufactured by Nippon Shokubai Co., Ltd., were added to a water-soluble polyester "Aron Melt PES-1000", manufactured by Toagosei Co., Ltd., at a ratio (mass ratio) of 95/5/0.5 and diluted with water.

Example 1

In Example 1, a packaging material 10 was prepared by the following method. As a metal foil layer 14, soft aluminum foil 8079 with a thickness of 40 μm (manufactured by Toyo Aluminium K.K.) was used. A sodium polyphosphate-stabilized cerium oxide sol (anticorrosion treatment agent) was applied to both surfaces of the metal foil layer 14 by gravure coating. The sol was prepared using distilled water as a solvent, and controlled to have a solid content concentration of 10 mass %. The sol contained 10 parts by mass of phosphoric acid, relative to 100 parts by mass of cerium oxide.

Then, the applied sodium polyphosphate-stabilized cerium oxide sol was dried and then baked to form an anticorrosion treatment layer 15a on a surface of the metal foil treatment 14 and an anticorrosion treatment layer 15b on the other surface. The baking conditions in this case were 150° C. temperature and 30-second treatment time.

Then, a polyester film A-1 serving as a substrate layer 11 was corona-treated on one surface.

Then, a polyurethane-based adhesive was applied, as an adhesive layer 13, to a surface of the anticorrosion treatment layer 15a, on a side opposite to that facing the metal foil layer 14. Then, the metal foil layer 14 was adhered to the corona-treated surface of the substrate layer 11 via the adhesive layer 13 by dry lamination. After that, the structure made up of the substrate layer 11, the adhesive layer 13, the anticorrosion treatment layer 15a, the metal foil layer 14, and the anticorrosion treatment layer 15b was left standing in an atmospheric air of 60° C. for 6 days for aging treatment. After that, a total of three types of packaging materials 10 having a dry lamination structure or a heat lamination structure were prepared, as shown below, according to the adhesive component forming the sealant adhesive layer 16.

Dry Lamination Structure

A polyurethane-based adhesive serving as a sealant adhesive layer 16 was applied to a surface of the anticorrosion treatment layer 15b, on a side opposite to that facing the metal foil layer 14. The polyurethane-based adhesive was prepared by adding polyisocyanate to acid modified polyolefin that was dissolved in a mixed solvent of toluene and methylcyclohexane. Then, a polyolefin film with a thickness of 40 μm (non-stretched polypropylene film having a sealant adhesive layer 16 side corona-treated surface) serving as a sealant layer 17 was adhered to the metal foil layer 14 via the sealant adhesive layer 16 by dry lamination. After that, the structure made up of the substrate layer 11, the adhesive layer 13, the anticorrosion treatment layer 15a, the metal foil layer 14, the anticorrosion treatment layer 15b, the sealant adhesive layer 16, and the sealant layer 17 was left standing in an atmospheric air of 40° C. for 6 days for aging treatment. Thus, a packaging material 10 was produced.

Heat Lamination Structure (160° C. or 200° C.)

A sealant adhesive layer 16 was formed by extruding maleic anhydride modified polypropylene (Trade name: ADMER, manufactured by Mitsui Chemicals, Inc.) serving as a base material of the sealant adhesive layer 16. The sealant adhesive layer 16 was ensured to have a thickness of 15 Then, a polyolefin film with a thickness of 30 μm (non-stretched polypropylene film having a sealant adhesive layer 16 side corona-treated surface) serving as a sealant layer 17 was adhered (heated and pressure-bonded) to the anticorrosion treatment layer 15b at 160° C. or 200° C. via the sealant adhesive layer 16 by sandwich lamination instead of dry lamination. Thus, a packaging material 10 was produced.

Examples 2 to 6, 11 and 12, and Comparative Examples 1 to 5

Packaging materials 10 were prepared in the same manner as in Example 1 except for using the polyester films shown in Table 1 instead of using the polyester film A-1.

Example 7

A packaging material 10 was prepared in the same manner as in Example 1 except that the adhesion-enhancing treatment layer 12 was formed on the adhesive layer 13 side surface of the substrate layer 11 instead of corona-treating the surface of the substrate layer 11, and a polyester film A-3 was used instead of the polyester film A-1. A coating agent serving as a base material of the adhesion-enhancing treatment layer 12 was applied to a surface of the substrate layer 11 by in-line coating so as to have a solid content of 0.1 g/m², followed by drying, thereby forming an adhesion-enhancing treatment layer 12 with a thickness of approximately 0.1 μm.

Example 8

A packaging material 10 was prepared in the same manner as in Example 1 except that a lubricant was applied to a surface of the sealant layer 17 (innermost surface of the packaging material 10) to decrease static friction coefficient, and a polyester film A-3 was used instead of the polyester film A-1. As the lubricant, erucic acid amide was used.

Example 9

A packaging material 10 was prepared in the same manner as in Example 1 except that the packaging material 10 was heated at 80° C. for 5 days to increase static friction coefficient of the surface of the sealant layer 17, and a polyester film A-3 was used instead of the polyester film A-1.

Example 10

A packaging material 10 was prepared in the same manner as in Example 1 except that anticorrosion treatment layers 15a and 15b were formed by chromate treatment instead of forming them using a sodium polyphosphate stabilized cerium oxide sol, and a polyester film A-3 was used instead of the polyester film A-1. The chromate treatment was performed by applying a treatment liquid, which contained a phenolic resin, a chromium fluoride compound, and phosphoric acid, onto both surfaces of the metal foil layer 14 to form respective coating films, followed by baking.

<Evaluation on Drawing Depth>

For the three types of packaging materials 10 produced in the examples and the comparative examples, drawing depth of deep drawing was evaluated by the following method. First, each packaging material 10 was arranged in a forming apparatus, with the sealant layer 17 facing upward. Forming depth of the forming apparatus was set to 3.5 mm to 7.0 mm in steps of 0.5 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD). The presence/absence of breakage and pinholes in the cold-formed area was visually checked by irradiating the packaging material 10 with light to thereby obtain a maximum value of drawing depth (forming limit) with which the packaging material was deep-drawn causing neither breakage nor pinholes. The results are shown in Table 2.

<Evaluation of Adhesion>

For the packaging materials 10 of heat lamination structure (160° C.) produced in the examples and the comparative examples, adhesion between the substrate layer 11 and the metal foil layer 14 was evaluated using the following method. First, each packaging material 10 was arranged in a forming apparatus, with the sealant layer 17 facing upward. The forming depth of the forming apparatus was set to 5 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD).

Then, the cold-formed packaging material 10 was placed in a 100 mL capacity beaker containing 30 mL of 1 M lithium hexafluorophosphate solution (solvent volume ratio=ethyl carbonate:dimethyl carbonate:dimethyl carbonate=1:1:1). Then, the beaker containing the packaging material 10 was sealed in an 18-liter can and left standing in an environment of 40° C. for 2 hours to expose the packaging material 10 to the electrolyte. After that, the packaging material 10 was taken out of the beaker in the 18-liter can and placed in a 110° C. oven, or in an environment of 60° C. and 95% humidity, or in 50° C. hot water. Then, the presence/absence of separation between the substrate layer 11 and the metal foil layer 14 of the packaging material 10 was visually checked after 1, 2, 3 and 4 weeks to thereby obtain a maximum value (unit: week) of the period during which no separation was observed between the substrate layer 11 and the metal foil layer 14. Based on the results, adhesion between the substrate layer 11 and the metal foil layer 14 was evaluated according to the following evaluation criteria. The results are shown in Table 2. It should be noted that adhesion was not evaluated for Comparative Examples 3 to 5 because the forming limit was less than 5 mm.

A: No separation was observed after 4 weeks.
B: No separation was observed after 3 weeks but was observed after 4 weeks.

<Evaluation of White Powder>

The packaging materials of a heat lamination structure (160° C.) prepared in the examples and the comparative examples were each cold-formed 10,000 times in a row with a deep drawing depth of 5 mm, by using a forming apparatus capable of performing cold forming of 70 mm×80 mm drawn area. Each packaging material after the cold forming was checked as to whether there was any deposit thereon attributed to dirt of the die, as a result of the cold forming. It should be noted that the packaging materials with a forming limit of less than 5 mm were not evaluated.

A: No deposit was observed on the packaging material after cold forming 10,000 times, and even after directly conducting the subsequent cold forming 15,000 times in a row without cleaning the die, deposit was still not visually observed on the packaging material.

B: No deposit was observed on the packaging material after cold forming 10,000 times, but after directly conducting the subsequent cold forming 15,000 times in a row without cleaning the die, deposit attributed to dirt of the die was visually observed on the cold-formed packaging material.

TABLE 2

| | Surface treatment of contact surface | Surface treatment of metal foil layer | Static friction coefficient of sealant layer surface | Forming limit [mm] Dry lamination | Forming limit [mm] Heat 160° C. | Forming limit [mm] Heat 200° C. | Adhesion 110 deg | Adhesion 65° C. 95% | Adhesion 50° C. hot water | White powder |
|---|---|---|---|---|---|---|---|---|---|---|
| Ex. 1 | Corona | Cerium oxide | 0.25 | 6.0 | 6.0 | 6.0 | A | A | A | A |
| Ex. 2 | Corona | Cerium oxide | 0.25 | 6.0 | 6.0 | 6.0 | A | A | A | A |
| Ex. 3 | Corona | Cerium oxide | 0.25 | 6.0 | 6.0 | 6.0 | A | A | A | A |
| Ex. 4 | Corona | Cerium oxide | 0.25 | 6.0 | 6.0 | 6.0 | A | A | A | A |
| Ex. 5 | Corona | Cerium oxide | 0.25 | 6.0 | 6.0 | 6.0 | A | A | A | A |
| Ex. 6 | Corona | Cerium oxide | 0.25 | 6.0 | 6.0 | 6.0 | A | A | A | A |
| Ex. 7 | Adhesion enhancement | Cerium oxide | 0.25 | 6.5 | 6.5 | 6.5 | A | A | A | A |
| Ex. 8 | Corona | Cerium oxide | 0.8 | 6.5 | 6.5 | 6.5 | A | A | A | B |
| Ex. 9 | Corona | Cerium oxide | 0.35 | 5.5 | 5.5 | 5.5 | A | A | A | A |
| Ex. 10 | Corona | Chromate | 0.25 | 6.0 | 6.0 | 6.0 | B | A | A | A |
| Ex. 11 | Corona | Cerium oxide | 0.25 | 6.0 | 6.0 | 5.5 | A | A | A | A |
| Ex. 12 | Corona | Cerium oxide | 0.25 | 6.0 | 6.0 | 5.5 | A | A | A | A |
| Comp. Ex. 1 | Corona | Cerium oxide | 0.25 | 5.0 | 5.0 | 5.0 | A | A | A | A |
| Comp. Ex. 2 | Corona | Cerium oxide | 0.25 | 5.0 | 5.0 | 5.0 | A | A | A | A |
| Comp. Ex. 3 | Corona | Cerium oxide | 0.25 | 4.5 | 4.5 | 3.5 | — | — | — | — |
| Comp. Ex. 4 | Corona | Cerium oxide | 0.25 | 4.5 | 4.5 | 4.0 | — | — | — | — |
| Comp. Ex. 5 | Corona | Cerium oxide | 0.25 | 3.5 | 3.5 | 3.5 | — | — | — | — |

INDUSTRIAL APPLICABILITY

The present disclosure provides a power storage device packaging material having adequate deep-drawing properties, and a power storage device using the packaging material.

REFERENCE SIGNS LIST

1 . . . Battery elements; 2 . . . Lead; 10 . . . Packaging material (power storage device packaging material); 11 . . . Substrate layer; 12 . . . Adhesion-enhancing treatment layer; 13 . . . Adhesive layer; 14 . . . Metal foil layer; 15a, 15b . . . Anticorrosion treatment layer; 16 . . . Sealant adhesive layer; 17 . . . Sealant layer; 30 . . . Embossed packaging material; 32 . . . Recess (shaped area); 34 . . . Cover portion; 40 . . . Secondary battery.

What is claimed is:

1. A power storage device packaging material, comprising a structure including at least a substrate layer, an adhesive layer, a metal foil layer, a sealant adhesive layer, and a sealant layer laminated in this order, wherein
the substrate layer is a polyester film, which was exposed to heat treatment at 160° C., wherein the polyester film exhibits ΔA, as expressed by the following Formula (1), of 10% or more and a 50% elongation stress of 75 MPa or more after the heat treatment at 160° C.:

$$\Delta A = (\text{break elongation after the 160° C. heat treatment}) - (\text{break elongation before the 160° C. heat treatment}) \quad (1)$$

wherein the break elongation and the 50% elongation stress are each an average of tensile tests at 23° C. (test piece shape: dumbbell No. 5 according to JIS K7127, length between chucks: 75 mm, gauge length: 25 mm, test speed: 50 mm/min) in four directions (0° (MD), 45°, 90° (TD), 135°) of the substrate layer.

2. The power storage device packaging material of claim 1, wherein the polyester film has a piercing strength of 0.6 N/μm or more.

3. A power storage device packaging material, comprising:
a structure including at least a substrate layer, an adhesive layer, a metal foil layer, a sealant adhesive layer, and a sealant layer laminated in this order, wherein
the substrate layer is a polyester film having a piercing strength of 0.6 N/μm or more, wherein the polyester film was exposed to heat treatment at 160° C., wherein the polyester film exhibits ΔA, as expressed by the following formula (1), of 10% or more:

$$\Delta A = (\text{break elongation after the 160° C. heat treatment}) - (\text{break elongation before the 160° C. heat treatment}) \quad (1)$$

wherein the break elongation is an average of tensile tests at 23° C. (test piece shape: dumbbell No. 5 according to JIS K7127, length between chucks: 75 mm, gauge length: 25 mm, test speed: 50 mm/min) in four directions (0° (MD), 45°, 90° (TD), 135°) of the substrate layer.

4. The power storage device packaging material of claim 3, wherein the polyester film has a 50% elongation stress of 75 MPa or more after the 160° C. heat treatment.

5. The power storage device packaging material according to claim 1, wherein the polyester film has a 50% elongation stress of 75 MPa or more after 200° C. heat treatment.

6. The power storage device packaging material of claim 1, further comprising an adhesion-enhancing treatment layer provided between the substrate layer and the adhesive layer.

7. The power storage device packaging material according to claim 6, wherein the adhesion-enhancing treatment layer is a layer containing at least one resin selected from a group consisting of a polyester resin, an acrylic resin, a polyurethane resin, an epoxy resin, and an acrylic grafted polyester resin.

8. The power storage device packaging material of claim 1, further comprising anticorrosion treatment layers respectively provided on both surfaces of the metal foil layer.

9. The power storage device packaging material of claim 8, wherein the anticorrosion treatment layers contain a rare earth element oxide, and phosphoric acid or a phosphate salt.

10. The power storage device packaging material of claim 9, wherein the rare earth element oxide is a cerium oxide.

11. The power storage device packaging material of claim 1, wherein the sealant layer has a surface with a static friction coefficient in a range of 0.10 to 0.30.

12. A power storage device comprising:

battery elements including electrodes, leads respectively extending from the electrodes, and a container sandwiching and holding the leads and storing the battery elements, wherein the container is formed of the power storage device packaging material of claim 1, with the sealant layer being located on the inside.

* * * * *